US009883499B2

(12) United States Patent
Boudreau et al.

(10) Patent No.: US 9,883,499 B2
(45) Date of Patent: *Jan. 30, 2018

(54) DOWNLINK CONTROL FOR WIRELESS HETEROGENEOUS TELECOMMUNICATIONS

(71) Applicant: Telefonaktiebolaget L M Ericsson (publ), Stockholm (SE)

(72) Inventors: Gary David Boudreau, Kanata (CA); Konstantinos Dimou, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 36 days.

This patent is subject to a terminal disclaimer.

(21) Appl. No.: 14/679,107

(22) Filed: Apr. 6, 2015

(65) Prior Publication Data

US 2015/0215915 A1 Jul. 30, 2015

Related U.S. Application Data

(63) Continuation of application No. 12/978,192, filed on Dec. 23, 2010, now Pat. No. 9,002,367.

(51) Int. Cl.
H04W 4/00 (2009.01)
H04W 72/04 (2009.01)
H04B 7/024 (2017.01)
H04W 36/00 (2009.01)
H04W 16/32 (2009.01)
H04W 84/04 (2009.01)

(52) U.S. Cl.
CPC .......... *H04W 72/042* (2013.01); *H04B 7/024* (2013.01); *H04W 36/0033* (2013.01); *H04W 16/32* (2013.01); *H04W 84/045* (2013.01)

(58) Field of Classification Search
CPC ........... H04W 72/042; H04W 36/0033; H04W 84/045; H04W 16/33; H04B 7/024
See application file for complete search history.

(56) References Cited

U.S. PATENT DOCUMENTS

2010/0261493 A1* 10/2010 Guey ................. H04B 7/024
455/501
2010/0322180 A1* 12/2010 Kim .................. H04W 72/1289
370/329

(Continued)

OTHER PUBLICATIONS

R1-102307, NTT DOCOMO, "Interference Coordination for Non-CA.-Based Heterogeneous Networks," Apr. 2010.

(Continued)

*Primary Examiner* — Abdelnabi O Musa
(74) *Attorney, Agent, or Firm* — Baker Botts, LLP

(57) ABSTRACT

A heterogeneous radio access network (20) comprises a macro layer (22) including at least one macro base station (24) and a micro layer comprising at least one micro base station (26). In an example embodiment a base station node comprises a scheduler (40) and a communication interface (42). The scheduler (40) is configured to prepare a subframe for transmission over a radio interface by configuring the subframe to include a micro layer downlink control channel region in addition to a macro layer downlink control channel region. The communication interface (42) is configured to transmit at least the subframe over the radio interface.

20 Claims, 20 Drawing Sheets

(56) References Cited

U.S. PATENT DOCUMENTS

2012/0076106 A1* 3/2012 Bhattad ................ H04L 5/0035
370/330
2015/0139141 A1* 5/2015 Seo ........................ H04J 11/005
370/329

OTHER PUBLICATIONS

R1-101106, Research in Motion UK Limited, PDCCJI Interference Management for Heterogeneous Network, Feb. 2010.
Written Opinion of the Preliminary Examining Authority for PCT/IB2011/003060, dated Mar. 11, 2013.
Y. Liang, A. Goldsmith, G. Foschini, R. Valenzuela, D. Chizhik, "Evolution of Base Stations in Cellular Networks: Denser Deployment vs Coordination", IEEE ICC 2008, Conference, pp. 5, May 2008.
International Search Report and Written Opinion dated Mar. 16, 2012 in PCT Application No. PCT/182011/003060, dated Mar. 16, 2012.
Kyocera, "Interference Management for Control Channels in Outdoor Hotzone Scenario", 3GPP TSG RAN WG1 Meeting #61, R1-102678, Montreal, Canada, 10-14, May 2010.
Fujitsu, "Considerations on Enhanced ICIC Schemes for Data Channel in HetNet", 3GPP TSG RAN WG1 Meeting #62bis, R1-105681, Xian, China, 11-15, Oct. 2010.
Fujitsu, "Discussion on Enhanced ICIC Schemes for Control Channel in HetNet", 3GPP TSG RAN WG1 Meeting $61bis, R1-104049, Dresden, Germany, Jun. 28-Jul. 2, 2010.

* cited by examiner

DOWNLINK CONTROL FOR WIRELESS HETEROGENEOUS TELECOMMUNICATIONS

PRIORITY

This application is a continuation, under 35 U.S.C. § 120, of U.S. application Ser. No. 12/978,192, filed Dec. 23, 2010, which is incorporated herein by reference.

TECHNICAL FIELD

This invention pertains to telecommunications, and particularly to downlink (DL) control signaling in a heterogeneous radio access network.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Universal Terrestrial Radio Access Network (E-UTRAN) are ongoing within the 3$^{rd}$ Generation Partnership Project (3GPP). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has an essentially "flat" architecture comprising radio base station nodes without reporting to radio network controller (RNC) nodes.

The constantly increasing demand for high data rates in cellular networks requires new approaches. A challenging question for network operators is how to evolve their existing cellular networks so as to meet the requirement for higher data rates. In this respect, a number of approaches are possible: (i) increase the density of their existing macro base stations; (ii) increase the cooperation between macro base stations; or (iii) deploy smaller base stations in areas where high data rates are needed within a macro base stations grid. Concerning the second approach, e.g., increasing the cooperation between macro base stations, see Y. Liang, A. Goldsmith, G. Foschini, R. Valenzuela, D. Chizhik, "Evolution of Base Stations in Cellular Networks: Denser Deployment vs Coordination", IEEE ICC 2008, Conference, pp. 5, May 2008.

Such a smaller radio base station is also called a "femto radio base station" and/or a "home radio base station" and/or "pico radio base station" and/or "micro radio base station" in some contexts. All such small radio base stations are collectively referred to herein as a micro base station, which is in contrast to a macro cell covered by a macro or standard radio base station.

The last option is referred to in the related literature as a "Heterogeneous Network", or "Heterogeneous Deployment" and the layer consisting of smaller base stations is termed a "micro", or "pico" layer.

Building a denser macro base station grid while simultaneously enhancing the cooperation between macro base stations (hence either using options (i) or (ii) above) is a solution that meets the requirement for higher data rates. However, such an approach is not necessarily a cost-efficient option due, e.g., to the costs and delays associated with the installation of macro base stations, especially in urban areas where these costs are significant.

The solution of deploying small base stations within the already existing macro layer grid is an appealing option, since these smaller base stations are anticipated to be more cost-efficient than macro base stations, and their deployment time will be shorter as well. However, such a dense deployment of macro base stations may lead to a significantly higher amount of signaling due to frequent handovers for users moving at high speeds.

In contrast, the macro layer grid of a heterogeneous network (as illustrated in FIG. 19) can serve users moving at high speed, as well as service wider areas where the demand for high data rates is less and the grid comprising smaller base stations in the heterogeneous network can be employed to service areas having a higher density of users requiring high data rates, or "hotspots" as these areas are termed.

One of the main targets of low power nodes is to absorb as many users as possible from the macro layers. This would offload the macro layer and it will allow for higher data rates in both the macro and in the micro layer.

In this respect, several techniques have been discussed and proposed within 3GPP: (i) extending the range of small cells by using cell specific cell selection offsets; and (ii) by increasing the transmission power of low power nodes & by simultaneously setting appropriately the UL power control target power (P0) for the users connected to low power nodes.

By applying any of the above techniques the interference in the downlink control channels increases. However, since downlink control channels in Long Term Evolution (LTE) are transmitted over the whole bandwidth, classical intercell interference (ICIC) mechanisms cannot be applied.

Hence there is a need for evolved ICIC mechanisms especially for the downlink physical layer control channels. The main technique which has been investigated by the Long Term Evolution (LTE) standardization process is to employ "Almost Blank Subframes" (ABS) at the macro layer. Using ABS, the macro layer is muted so as not to create high other cell interference to users that are both connected to low power nodes and are located at the extended range of the low power nodes.

Almost Blank Subframes (ABS) is a technique which does solve the problem of interference generated by the macro layer to users connected to low power nodes and located at the extended range of low power nodes. However, the drawback of the ABS technique is that resources are not fully used at the macro layer. Moreover, for the case in which the macro layer is heavily loaded and the number of users located at the extended range is low, a number of users will have to underutilize their resources so as not to interfere with users located at the extended range of low power nodes. In such a scenario, the capacity of the heterogeneous network could be limited by congestion or lack of capacity on the downlink control channel.

SUMMARY

In one of its aspects the technology disclosed herein concerns a base station node of a heterogeneous radio access network. The heterogeneous radio access network comprises a macro layer including at least one macro base station and a micro layer comprising at least one micro base station. In an example embodiment the base station node comprises a scheduler and a communication interface. The scheduler is configured to prepare a subframe for transmission over a radio interface by configuring the subframe to include a micro layer downlink control channel region in addition to a macro layer downlink control channel region. The communication interface is configured to transmit at least the subframe over the radio interface.

In an example embodiment, the base station further comprises a network condition monitor configured to ascertain a predetermined condition of the heterogeneous radio access network. In such embodiment the scheduler is configured, as a result of ascertainment of the predetermined condition, to prepare the subframe to include the micro layer downlink control channel region.

In an example embodiment and mode, the predetermined condition is at least one of: (1) a predetermined level of interference from signals in the macro layer downlink control channel region of the subframe (and whereby the micro level control channel of the micro level control channel region is a micro layer downlink control channel); (2) traffic load in the macro layer exceeding a threshold; and (3) a predetermined relation of (i) traffic load within the macro layer and (ii) traffic load within the micro layer.

In an example embodiment and mode, the scheduler is configured to dynamically activate and deactivate the micro layer downlink control channel region in dependence upon the predetermined condition.

In an example embodiment and mode, the base station further comprises a coordinator configured to coordinate, with at least one other base station node of the heterogeneous radio access network, the inclusion of the micro layer downlink control channel region in the subframe.

In an example embodiment and mode, the base station node is a macro base station node and the scheduler is further configured: (i) to mute the micro layer downlink control channel region of the subframe as transmitted from the macro base station node and thereby mitigate interference with the micro layer downlink control channel region of the subframe as transmitted by a micro layer base station node; and (ii) to include downlink control signaling to one or more wireless terminals on the macro layer downlink control channel region.

In another example embodiment and mode, the base station node is a micro base station node and the scheduler is configured: (i) to mute the macro layer downlink control channel region of the subframe as transmitted from the micro base station node (and thereby mitigate interference with the macro layer downlink control channel region of the subframe as transmitted by a macro layer base station node); and (ii) to include downlink control signaling to one or more wireless terminals on the micro layer downlink control channel region.

In an example embodiment and mode, the micro layer downlink control channel region comprises at least one micro layer downlink control channel, and the micro layer downlink control channel region is outside resources allocated to the macro layer downlink control channel region of the subframe.

In an example embodiment and mode, the scheduler is realized, at least in part, by electronic circuitry which comprises at least the scheduler.

In one example embodiment and mode, with respect to symbol order of the subframe, the scheduler is configured to include the micro layer downlink control channel region after the macro layer downlink control channel region. In another example embodiment and mode, with respect to symbol order of the subframe, the scheduler is configured to include the micro layer downlink control channel region before the macro layer downlink control channel region. In yet another example embodiment and mode, the scheduler is configured to interleave the micro layer downlink control channel region with the macro layer downlink control channel region.

In an example embodiment and mode, both the macro layer downlink control channel region and the micro layer downlink control channel region are configured to include the same control information to a same wireless terminal.

In another of its aspects the technology disclosed herein concerns a method of operating a base station node of a heterogeneous radio access network. The heterogeneous radio access network comprises a macro layer including at least one macro base station and a micro layer comprising at least one micro base station. The method comprises configuring a subframe to include a micro layer downlink control channel region in addition to a macro layer downlink control channel region and transmitting at least the subframe over a radio interface.

In an example mode the method further comprises ascertaining a predetermined condition of the heterogeneous radio access network and preparing the subframe to include the micro layer downlink control channel region as a result of ascertainment of the predetermined condition.

In an example mode the predetermined condition is at least one of: (1) a predetermined level of interference from signals in the macro layer downlink control channel region of the subframe; (2) traffic load in the macro layer exceeding a threshold; and (3) a predetermined relation of (i) traffic load within the macro layer and (ii) traffic load within the micro layer.

In an example mode the method further comprises dynamically activating and deactivating the micro layer downlink control channel region in dependence upon the predetermined condition.

In an example mode the method further comprises the base station node coordinating, with at least one other base station node of the heterogeneous radio access network, the inclusion of the micro layer downlink control channel region in the subframe. For example, in one implementation the method further comprises the base station node coordinating the inclusion of the micro layer downlink control channel region in the subframe by communicating with a centralized node which determines whether the micro layer downlink control channel region is to be implemented in at least the base station node and the at least one other base station node. In another implementation the method further comprises the base station node coordinating the inclusion of the micro layer downlink control channel region in the subframe by handshaking communications with plural other base station nodes. In yet another implementation the method further comprises the base station node coordinating the inclusion of the micro layer downlink control channel region in the subframe by making a decision to include the micro layer downlink control channel region in the subframe and communicating the decision to plural other base station nodes.

In an example mode the base station node is a macro base station node and the method further comprises (i) muting the micro layer downlink control channel region of the subframe as transmitted from the macro base station node and thereby mitigating interference with the micro layer downlink control channel region of the subframe as transmitted by a micro layer base station node; and (ii) transmitting downlink control signaling to one or more wireless terminals on the macro layer downlink control channel region.

In yet another example mode the base station node is a micro base station node, and the method further comprises: (i) muting the macro layer downlink control channel region of the subframe as transmitted from the micro base station node (and thereby mitigating interference with the macro layer downlink control channel region of the subframe as transmitted by a macro layer base station node); and (ii) transmitting downlink control signaling to one or more wireless terminals on the micro layer downlink control channel region.

In an example mode, the method further comprises forming the micro layer downlink control channel region to comprise at least one micro layer downlink control channel and locating the micro layer downlink control channel region outside resources allocated to the macro layer downlink control channel region of the subframe.

In an example mode the method further comprises, with respect to symbol order of the subframe, including the micro layer downlink control channel region after the macro layer downlink control channel region. In another example mode the method further comprises, with respect to symbol order of the subframe, including the micro layer downlink control channel region before the macro layer downlink control channel region. In yet another example mode the method further comprises interleaving the micro layer downlink control channel region with the macro layer downlink control channel region.

In an example mode the method further comprising coordinating configuration of the macro layer downlink control channel region and the micro layer downlink control channel region whereby both the macro layer downlink control channel region and the micro layer downlink control channel region include the same control information to a same wireless terminal.

In another of its aspects the technology disclosed herein concerns a method of operating a heterogeneous radio access network. The heterogeneous radio access network comprises a macro layer including at least one macro base station and a micro layer comprising at least one micro base station. The method comprises: (1) making a determination of an occurrence of a predetermined condition in the heterogeneous radio access network; (2) in response to the determination, the macro base station(s) of the macro layer downlink control channel region and the micro base station(s) of the micro layer downlink control channel region each configuring a subframe to include a micro layer downlink control channel region in addition to a macro layer downlink control channel region; (3) the at least one macro base station muting the micro layer downlink control channel region of the subframe as transmitted from the at least one macro base station but transmitting downlink control signaling to one or more wireless terminals on the macro layer downlink control channel region; and, (4) the at least one micro base station muting the macro layer downlink control channel region of the subframe as transmitted from the at least one micro base station but transmitting downlink control signaling to one or more of the wireless terminals on the micro layer downlink control channel region.

In an example mode, the method further comprises further coordinating among plural base stations inclusion of the micro layer downlink control channel region in the subframe. In such mode the plural base stations comprise the at least one macro base station of the macro layer downlink control channel region and the at least one micro base station of the micro layer downlink control channel region. In an example implementation the method further comprises the plural base stations coordinating the inclusion of the micro layer downlink control channel region in the subframe by communicating with a centralized node; and the centralized node making a determination whether the micro layer downlink control channel region is to be implemented for the plural base stations. In another example implementation a designated one of the plural base stations makes a decision to include the micro layer downlink control channel region in the subframe.

In an example mode the method further comprises coordinating configuration of the macro layer downlink control channel region and the micro layer downlink control channel region whereby both the macro layer downlink control channel region and the micro layer downlink control channel region include same control information to a same wireless terminal.

In another of its aspects the technology disclosed herein comprises a method of operating a wireless terminal in a heterogeneous radio access network. The heterogeneous radio access network comprises a macro layer including at least one macro base station and a micro layer comprising at least one micro base station. The method comprises receiving an indication that a subframe carried over a radio interface includes a micro layer downlink control channel region in addition to a macro layer downlink control channel region; and obtaining a downlink control signal from either the micro layer downlink control channel region or the macro layer downlink control channel region.

In some example embodiments and modes, the downlink control signal from the macro layer downlink control channel region is the same as the downlink control signal from the micro layer downlink control channel region, and the method further comprises obtaining the downlink control signal from both the macro layer downlink control channel region and the micro layer downlink control channel region; and, choosing one of the downlink control signal from the macro layer downlink control channel region and the downlink control signal from the micro layer downlink control channel region from which to obtain an effective downlink control signal. In some example embodiments, however, if the quality of the control symbols in the macro layer downlink control channel region is sufficient, the wireless terminal will employ the macro layer downlink control channel region as opposed to the micro layer downlink control channel region. Otherwise the wireless terminal has the choice to employ the downlink control signals from micro layer downlink control channel region.

In another example mode wherein the downlink control signal from the macro layer downlink control channel region is the same as the downlink control signal from the micro layer downlink control channel region and the wireless terminal obtains the downlink control signal from both the macro layer downlink control channel region and the micro layer downlink control channel region, the method further comprises combining the downlink control signal from the macro layer downlink control channel region and the downlink control signal from the micro layer downlink control channel region to constructively form a better estimate of the downlink control signal.

In another of its aspects the technology disclosed herein concerns a wireless terminal for use in a heterogeneous radio access network. The heterogeneous radio access network comprises a macro layer including at least one macro base station and a micro layer comprising at least one micro base station. The wireless terminal comprises a communications interface and a frame handler. The communications interface is configured to receive an indication that a subframe carried over a radio interface includes a micro layer downlink control channel region in addition to a macro layer downlink control channel region. The frame handler is configured to obtain a downlink control signal from the macro layer downlink control channel region or the micro layer downlink control channel region.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1:
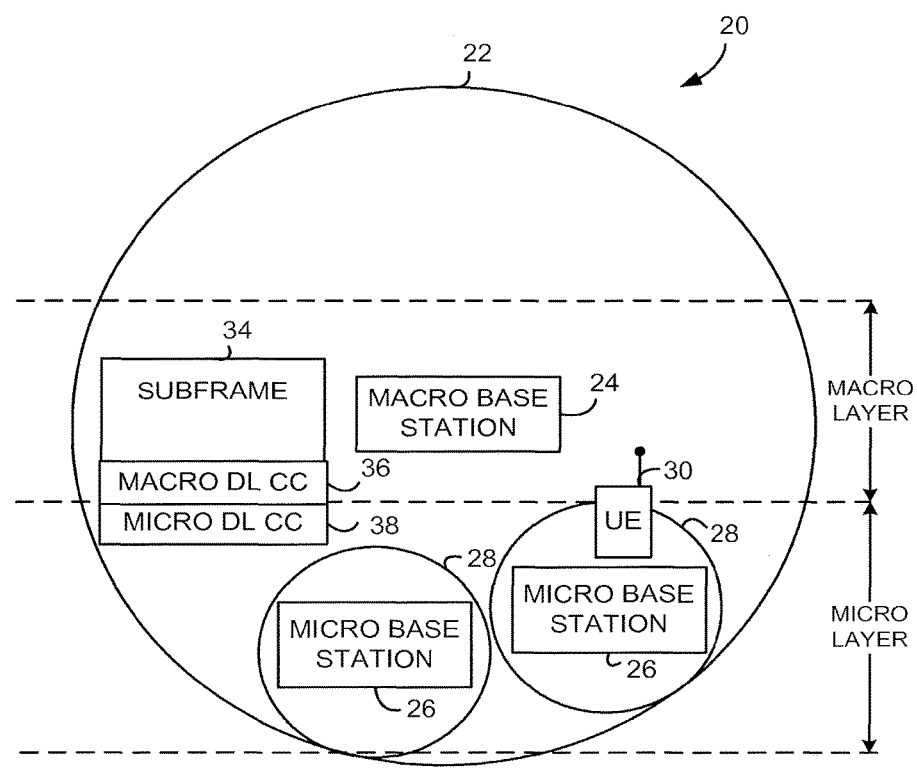
FIG. 1 is a diagrammatic view of portions of a heterogeneous radio access network which is simplified to illustrate a macro layer and a micro layer as well as a subframe that comprises a micro layer downlink control channel region.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

FIG. 1 shows portions of a heterogeneous radio access network 20, and particularly macro cell 22 which is served by macro base station 24. One or more micro base stations 26 are situated within or proximate macro cell 22. Each micro base station serves a corresponding micro cell 28. The macro and micro base stations communicate over an air or radio interface with one or more wireless terminals, also known as user equipment units (UEs). One such representative wireless terminal (UE) 30 is shown and arbitrarily positioned in FIG. 1.

FIG. 1 illustrates transmission of a subframe 34 of information over the air interface between a base station and a wireless terminal. In view of the heterogeneous nature of network 20 and the networks' inclusion of both macro and micro base stations, FIG. 1 further illustrates that radio transmissions in network 20 occur both at a macro layer and a micro layer. In particularly, macro base station 24 exchanges subframes with one or more wireless terminals in the macro layer, while the micro base stations 26 exchange subframes with one or more wireless terminals in the micro layer. The depiction in FIG. 1 of the stratification of the macro layer and the micro layer is simply for illustrating delineation of the two layers, and does not necessarily impose any geographical or territorial characteristics or restrictions with respect to either layer.

As used herein, the terminology "micro base station" is to be understood as broadly encompassing any type of station which operates over a radio or air interface on both downlink (DL) and uplink (UL) and has extent of transmission that is lesser than (e.g., in geographic range or power) or subordinate to (e.g., delegated from/by) a macro base station. In corresponding fashion the terminology "micro cell" refers to any cellular territory or coverage area served by such broadly defined micro base station. Examples of types of cells and base stations encompassed by the terminology "micro cell" and "micro base station" are illustrated in FIG. 2 as including pico cells and pico base stations, femto cells (which can exist in a femto cluster) and femto base stations, and relay base stations.

Figure 2:
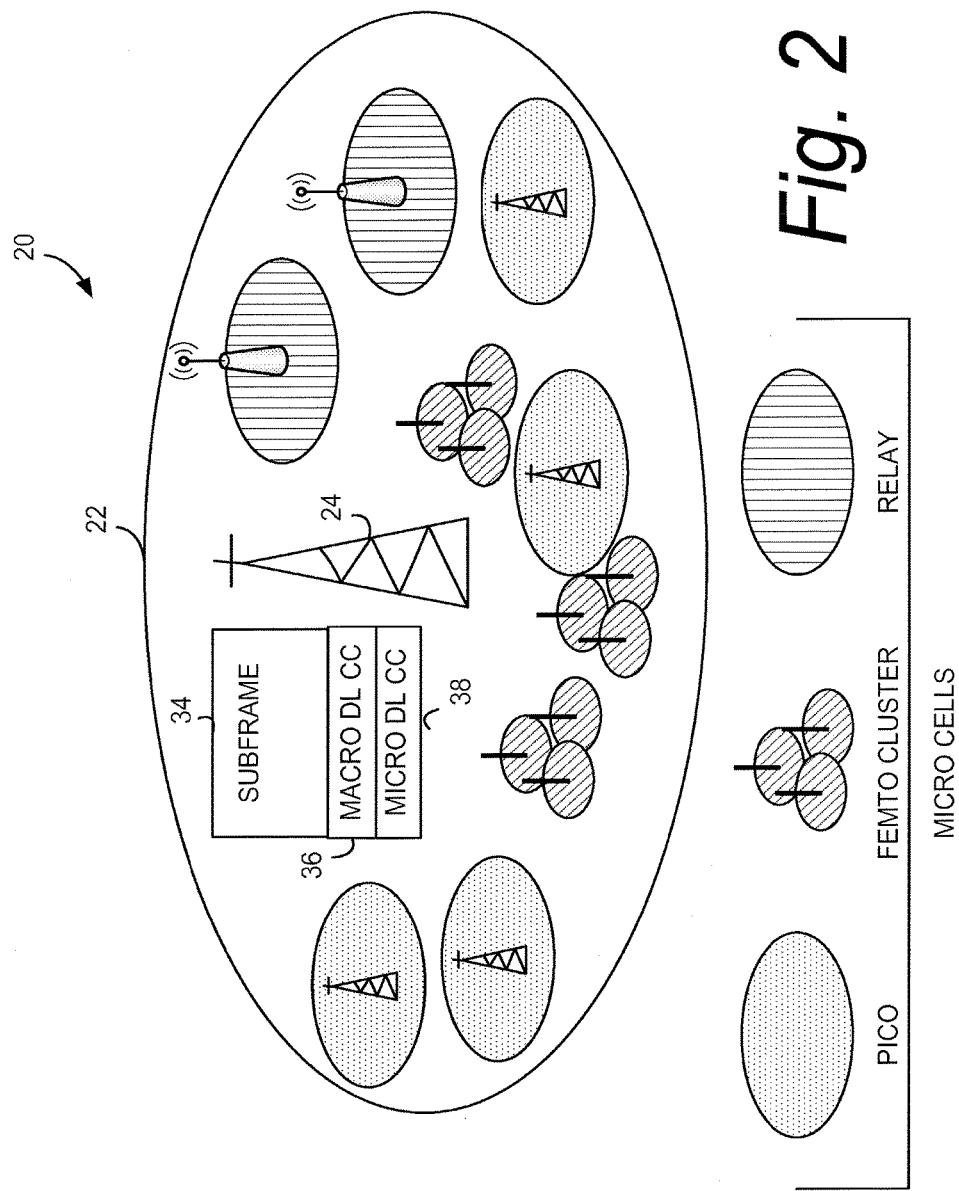
FIG. 2 is a diagrammatic view of portions of a heterogeneous radio access showing, e.g., example placement of different types of base stations as well as a subframe that comprises a micro layer downlink control channel region.

As will subsequently become more fully appreciated, FIG. 1 and FIG. 2 show only one macro cell 22 of heterogeneous radio access network 20. Typically a heterogeneous radio access network comprises plural (e.g., scores of) macro cells. Further, in some heterogeneous radio access networks the operation of the macro base stations for the macro cells and micro base stations for the micro cells may be coordinated, particularly in a Coordinated Multipoint (CoMP) system. In CoMP architecture a collection of cells (e.g., sub-cells) may be connected to a central node that coordinates the transmission/reception of user signals to mitigate interference among the smaller sub-cells. CoMP architecture is understood with reference to, e.g., U.S. patent application Ser. No. 12/563,589, entitled "Inter-Cell Interference Mitigation", also published as United States Patent Publication US 2010/0261493, which is incorporated herein by reference in its entirety.

Further, it should be understood that the illustration of FIG. 1 and FIG. 2 with only two macro cells and two micro base stations and their respective locations within or near the macro cell is not limiting, since a macro cell could encompass one or more than two micro cells and such micro cells may be diversely and non-uniformly arranged from one macro cell to another, depending upon geographic utilization and traffic need and conditions.

As mentioned previously, a "wireless terminal" encompasses mobile stations or user equipment units (UE) such as mobile telephones ("cellular" telephones) and laptops with wireless capability, e.g., mobile termination, and thus can be, for example, portable, pocket, hand-held, computer-included, or car-mounted mobile devices which communicate voice and/or data with radio access network. In some example embodiments a wireless terminal need not be mobile but can instead be fixed.

Information is typically transmitted over the air interface between base stations and wireless terminal in frames. In fact, in some radio access technologies a frame typically comprises plural subframes, with each of the subframes being formatted similarly and in a manner understood by both the base station and the wireless terminals. The frames and subframes are formatted so that the macro and micro base stations, on the one hand, and the wireless terminals 30, on the other hand, know what type of information to expect in different portions of fields of the frame/subframe. In some radio access technologies, a subframe is conceptualized as comprising a two dimensional array or "resource grid" of resource elements (RE), the resource elements being arranged in symbol order along a first (horizontal) direction and according to frequency subcarrier along a second (vertical) direction. With respect to the first or direction the symbols may be grouped into slots, e.g., six or seven symbols may comprise a slot of the subframe, with the subframe comprising plural (e.g., two) slots. At least some sets of resource elements of the subframe are generally allocated to serve as "channels", with some of the channels being used for transmission of control information while other channels are used for transmission of user data. Moreover, in some radio access technologies some channels of the subframe are allocated for transmission in a downlink (DL) [in a direction from a base station to a wireless terminal] while other channels of the subframe may be allocated for transmission in an uplink (e.g., in a direction from a wireless terminal to a base station). In a manner to comprehend and encompass all the foregoing, FIG. 1 illustrates a transmission of subframe 34 over the air interface between a base station and a wireless terminal. The terminology "subframe" as herein utilized is to be understood as encompassing any unit of information of repetitive or predefined format, and therefore is to be understood as being applicable to, e.g., a frame as well as a subframe.

In prior art practice a subframe transmitted between a wireless terminal and a macro base station includes a downlink control channel that includes macro layer downlink control information. In correlative fashion a subframe transmitted between a wireless terminal and a micro base station includes a downlink control channel that includes micro layer downlink control information. When the macro base station and micro base station are part of a Coordinated Multipoint (CoMP) system, the signaling or control information (e.g., the control channel) may be common for both the macro layer and the micro layer. In contrast to such prior art, an aspect of the technology disclosed herein and simply illustrated in FIG. 1 is inclusion in subframe 34 of both macro layer downlink control channel region 36 and micro layer downlink control channel region 38. Such aspect can be implementation in both systems that involve Coordinated Multipoint (CoMP) and systems that do not.

Example embodiments and implementations of the technology disclosed herein involve use of both macro layer downlink control channel region 36 and micro layer downlink control channel region 38 in the context of an existing 3GPP Long Term Evolution (LTE) Release 10 downlink. However, the technology disclosed herein is applicable to other radio access technologies or systems or protocols as well.

Figure 3A:
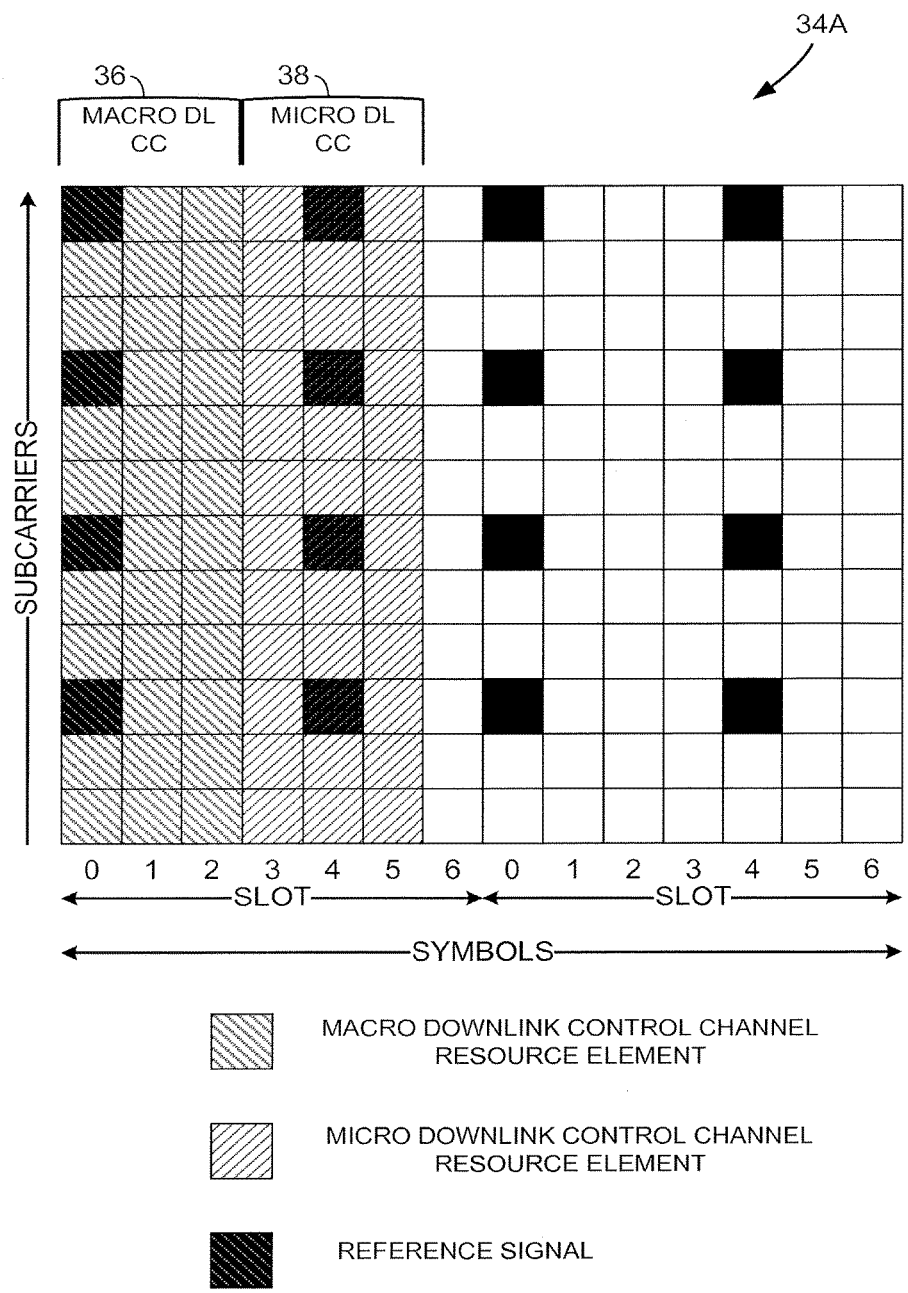
FIG. 3A is a diagrammatic view of portions of a subframe that comprises a micro layer downlink control channel region according to an example embodiment wherein, with reference to symbol order, a macro layer downlink control channel region precedes a micro layer downlink control channel region.
Figure 3B:
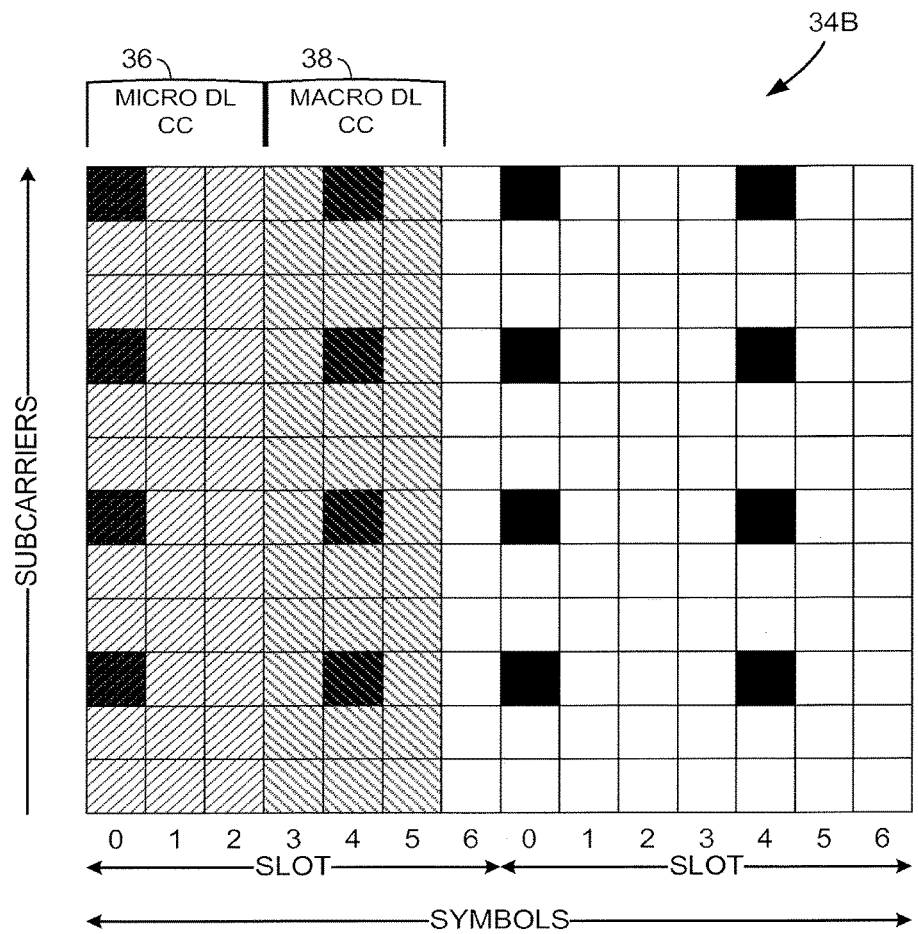
FIG. 3B is a diagrammatic view of portions of a subframe that comprises a micro layer downlink control channel region according to an example embodiment wherein, with reference to symbol order, a micro layer downlink control channel region precedes a macro layer downlink control channel region.
Figure 3C:
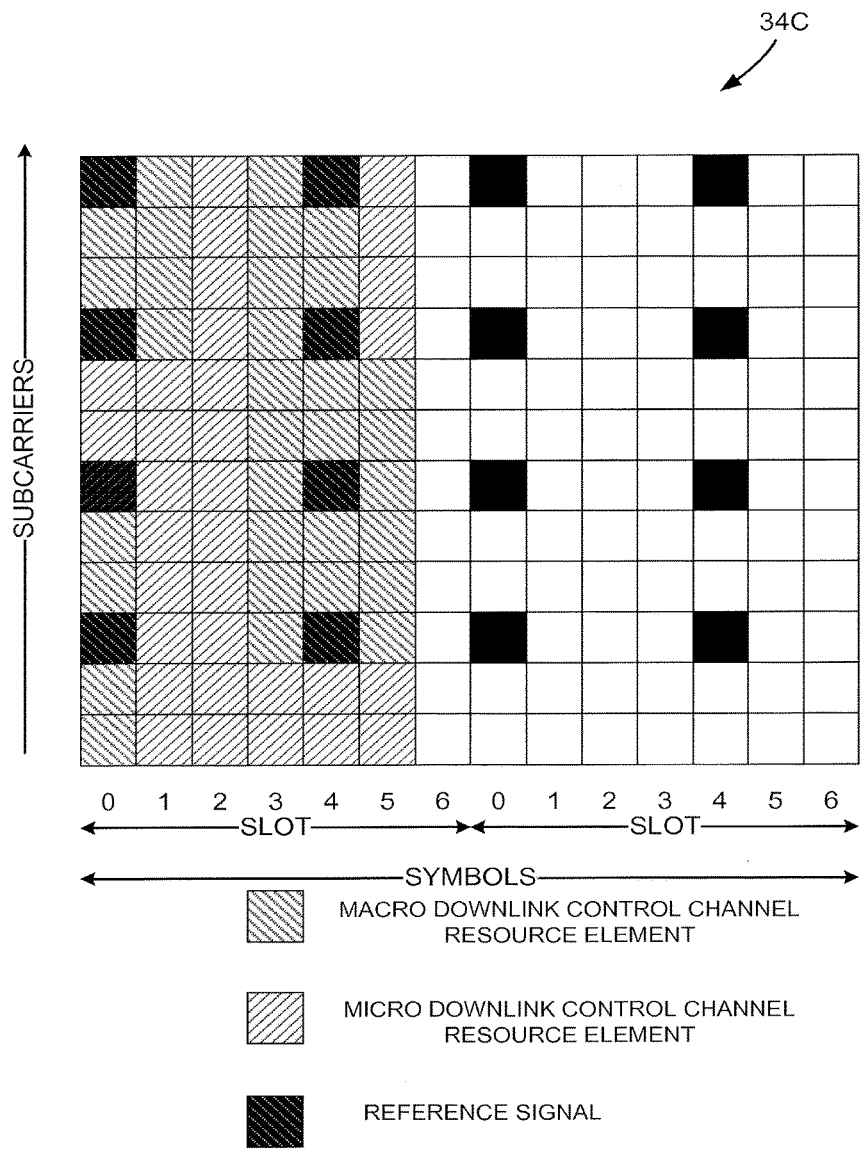
FIG. 3C is a diagrammatic view of portions of a subframe that comprises a micro layer downlink control channel region according to an example embodiment wherein resource elements of the micro layer downlink control channel region are interleaved resource elements of the macro layer downlink control channel region.

In the 3GPP LTE downlink (DL) the symbols are orthogonal frequency division multiplex (OFDM) symbols. Examples of differing subframes 34A, 34B, and 34C according to differing, non-limiting example embodiments in a 3GPP Long Term Evolution (LTE) context are illustrated in FIG. 3A, FIG. 3B, and FIG. 3C, respectively. Each of 3A, FIG. 3B, and FIG. 3C show respective subframes 34A, 34B, and 34C as comprising two slots, each slot comprising seven OFDM symbols. In LTE there are twelve subcarriers per resource block (RB), with six to one hundred ten resource blocks covering a bandwidth between 1.4 MHz up to 20 MHz. Accordingly, for sake of illustration twelve subcarriers are illustrated as comprising the subframes 34A, 34B, and 34C (it being understood that the number of subcarriers is considerably greater). Each of subframes 34A, 34B, and 34C are shown as comprising macro layer downlink control channel region 36, which in the 3GPP Long Term Evolution (LTE) context corresponds to the Physical Downlink Control Channel (PDCCH) symbols. In each of subframes 34A, 34B, and 34C, the resource elements of the PDCCH belonging to the macro layer downlink control channel region 36 are shown with hatching of decreasing slope. By contrast, the resource elements of the PDCCH belonging to the micro layer downlink control channel region 38 are shown with hatching of increasing slope. In FIG. 3A, FIG. 3B, and FIG. 3C certain "reference signals" are depicted by the completely darkened resource elements. FIG. 3A, FIG. 3B, and FIG. 3C show three symbols in each of the control regions, but the number of control symbols per control region could be one, two, three, or four.

In one of its aspects, in the 3GPP LTE context the technology disclosed herein adds, to the existing Physical Downlink Control Channel (PDCCH) [e.g., adds in addition to macro layer downlink control channel region 36], a number N of OFDM symbols to the control channel region, and uses the newly added OFDM symbols to form the micro layer downlink control channel region 38. The number of added OFDM symbols to the control channel region can range from one up to the configured PDCCH size (in terms of OFDM symbols) in the cell. The added control symbols may be employed by a micro cell within a CoMP session in parallel to the existing PDCCH symbols to be used by the macro layer 36. In an example implementation, these newly added symbols may be borrowed from the Physical Downlink Shared Channel (PDSCH) region.

As explained herein, in order to implement the addition of the micro layer downlink control channel region 38 to a subframe 34, the participating macro base stations (e.g., macro base station 24) in a CoMP session may "blank" the transmission of these additional OFDM symbols (e.g., the symbols of the micro layer downlink control channel region 38) in order to mitigate intercell interference of the control symbols employed by the micro cell. The "blanking" described herein differs from prior art blanking of an entire or almost entire subframe. Rather, the blanking of the technology disclosed herein concerns only of a downlink control signaling region.

Thus, the macro base stations 24 do not use the micro layer downlink control channel region 38 as a control channel, and in view of the "blanking" do not use the micro layer downlink control channel region 38 for transmission of any type of information at all. But for sake of explaining that symbols of the subframe are appropriated or allocated for use as control channels by the micro layer, the region of such appropriated symbols is referred to as the micro layer downlink control channel region 38. The serving macro base station (e.g., macro base station 24) continues to employ the Physical Downlink Control Channel (PDCCH) symbols in the existing Release 10 control region spanning typically the first one to four symbols of the subframe, in the manner of macro layer downlink control channel region 36 shown in FIG. 3A. Users in the extended range of the micro cells 28 may receive their control signaling information on these newly added OFDM symbols (e.g., the OFDM symbols of micro layer downlink control channel region 38).

As mentioned above, FIG. 3A, FIG. 3B, and FIG. 3C illustrate different embodiments, and particularly illustrate different relative arrangements of the macro layer downlink control channel region 36 and micro layer downlink control channel region 38. In FIG. 3A, with reference to symbol order, the macro layer downlink control channel region 36 precedes the micro layer downlink control channel region 38.

In the embodiment of FIG. 3B the additional downlink control OFDM symbols are implemented in the macro cell. In other words, with reference to symbol order, the micro layer downlink control channel region 38 precedes the macro layer downlink control channel region 36, with the micro layer downlink control channel region 38 using symbols nominally allocated to the prior art PDCCH while the macro layer downlink control channel region 36 uses the newly added symbols. The micro cells and macro cells participating in a CoMP session have to mute their respective Physical Downlink Shared Channel (PDSCH) area so as to avoid interfering with this newly added control symbols. In the embodiment of FIG. 3B, the micro base station employs the Physical Downlink Control Channel (PDCCH) symbols in the existing Release 9 control region spanning typically the first one to three symbols of the subframe.

In the embodiment of FIG. 3C, the additional control OFDM symbols are proposed and the control regions to be used by the different macro and micro base stations are interleaved in time and frequency. That is, resource elements of the micro layer downlink control channel region 38 are interleaved resource elements of the macro layer downlink control channel region 36. The FIG. 3 embodiment allows flexibility and implementation of adaptation mechanisms, but requires a very fast X2 interface to support the coordination, and involves more complexity in the scheduling. As understood in the art, the X2 interface is a point-to-point, inter-eNodeB interface. The protocol stack of the X2 interface is a mirror of the Si interface, the control plane application is called X2AP and is based on SCTP over IP over any L2/L1 layer. The X2 interface can be used for load management, e.g., neighboring eNodeBs exchanging data concerning their resources, traffic load, etc.

Figure 4:
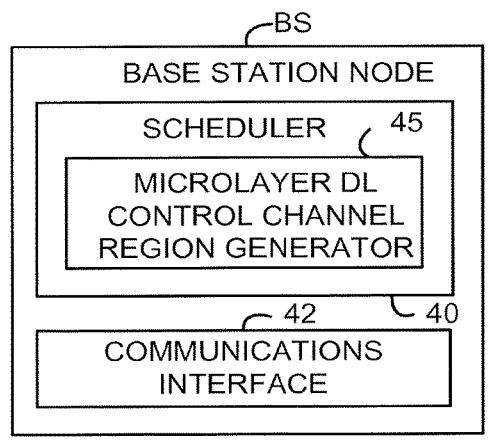
FIG. 4 is a schematic view of a base station node according to an example embodiment.

FIG. 4 shows a base station node BS according to an example embodiment. FIG. 4 is intended to be generic in the sense that the base station node BS can represent either a macro base station 24 or a micro base station 26. The base station node BS comprises scheduler 40 and communication interface 42. The scheduler 40 is configured to prepare a subframe for transmission over a radio interface by configuring the subframe to include a micro layer downlink control channel region 38 in addition to a macro layer downlink control channel region 36. To this end scheduler 40 comprises micro layer downlink control channel region generator 45. The communication interface 42 is configured to transmit at least the subframe over the radio interface.

Figure 5:
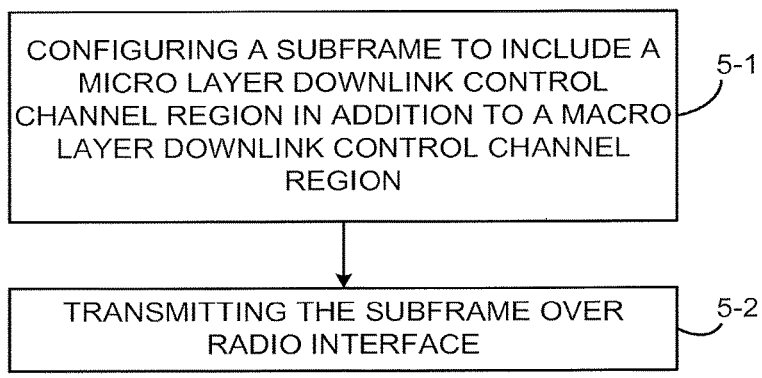
FIG. 5 is a flowchart showing representative, non-limiting acts or steps included in a basic method of operating a base station node according to an example embodiment and mode.

FIG. 5 shows representative, non-limiting acts or steps included in a basic method of operating a generic base station node according to an example embodiment and mode. Act 5-1 comprises configuring a subframe to include a micro layer downlink control channel region 38 in addition to a macro layer downlink control channel region 36. Act 5-2 comprises transmitting the subframe over a radio interface.

Although configuring the subframe to include both the macro layer downlink control channel region 36 and the micro layer downlink control channel region 38, the base station node BS does not use one of the control regions as a control region, and in fact essentially does not use one of the control regions at all. For example, if the base station node BS is a macro base station 24, the subframe is configured to include both the macro layer downlink control channel region 36 and the micro layer downlink control channel region 38, but the micro layer downlink control channel region 38 is blanked (e.g., has no meaningful content), with the macro base station 24 instead using the macro layer downlink control channel region 36 for control signaling. In such situation, the macro base station 24 configures the subframe so that the micro layer downlink control channel region 38 can be allocated for use as a control region by the micro layer. Conversely, if the base station node BS is a micro base station 26, the subframe is configured to include both the macro layer downlink control channel region 36 and the micro layer downlink control channel region 38, but the macro layer downlink control channel region 36 is blanked, with the micro base station 26 instead using the micro layer downlink control channel region 38 for control signaling. In such situation, the micro base station 26 configures the subframe so that the macro layer downlink control channel region 36 can be allocated for use as a control region by the macro layer.

Figure 6:
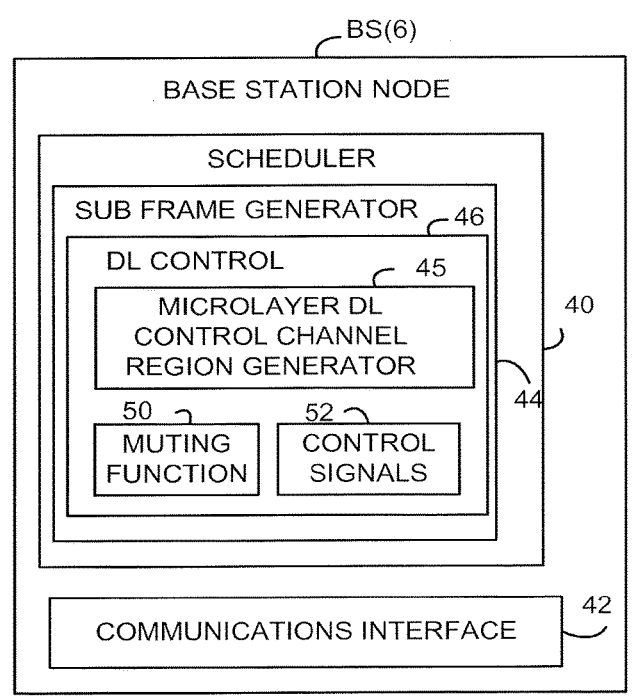
FIG. 6 is a schematic view of a base station node according to another example embodiment showing, e.g., more details of an example scheduler.

FIG. 6 shows, e.g., more details of an example scheduler of a generic base station node BS(6). The scheduler 40 of base station node BS(6) comprises subframe generator 44. As one of its constituent functionalities, subframe generator 44 comprises downlink control channel generator 46. It will be appreciated that subframe generator 44 comprises other functionalities, such as generators for non-control channels of the subframe. The downlink control channel generator 46 comprises the aforementioned micro layer downlink control channel region generator 45; muting or blanking function 50; and control signal generator 52. As understood from the foregoing, the micro layer downlink control channel region 38 as generated by micro layer downlink control channel region generator 45 will either include blanks (inserted by muting function 50 when the base station node BS(6) is a macro base station) or control signals (inserted by control signal generator 52) when the base station node BS(6) is a micro base station. When the base station node BS(6) is a macro base station, the control signal generator 52 will fill the macro layer downlink control channel region 36 with control signals, and muting function 50 will blank the micro layer downlink control channel region 38. Conversely, when the base station node BS(6) is a micro base station, the control signal generator 52 will fill the micro layer downlink control channel region 38 while the muting function 50 will blank the macro layer downlink control channel region 36.

Figure 7A:
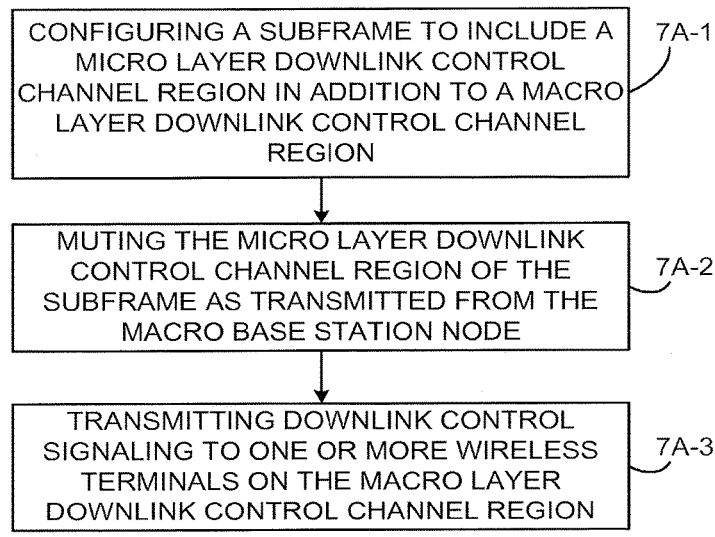
FIG. 7A is a flowchart showing representative, non-limiting acts or steps included in a method of operating a macro base station node according to an example embodiment and mode which comprises muting of a micro layer downlink control channel region.

Consistent with the foregoing, FIG. 7A shows representative, non-limiting acts or steps included in a method of operating a macro base station node according to an example embodiment and mode. Act 7A-1 comprises configuring a subframe to include a micro layer downlink control channel 38 region in addition to a macro layer downlink control channel region 36. Act 7A-2 comprises blanking or muting the micro layer downlink control channel region 38 of the subframe as transmitted from the macro base station node. Act 7A-3 comprises transmitting downlink control signaling to one or more wireless terminals on the macro layer downlink control channel region 38.

Figure 7B:
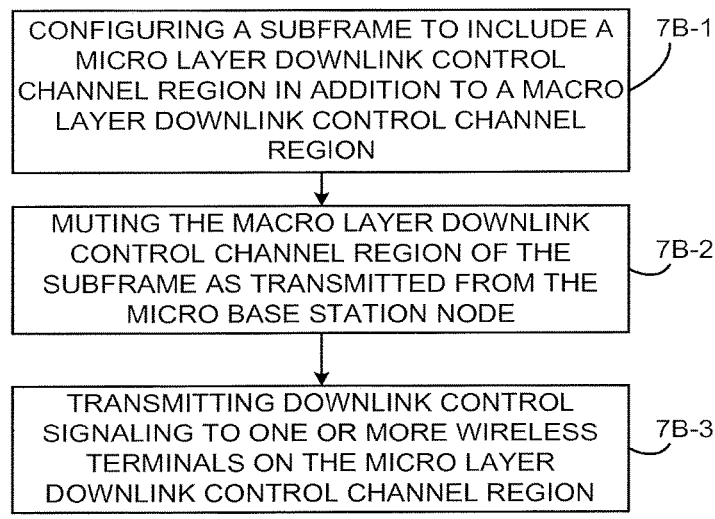
FIG. 7B is a flowchart showing representative, non-limiting acts or steps included in a method of operating a micro base station node according to an example embodiment and mode which comprises muting of a macro layer downlink control channel region.

FIG. 7B shows representative, non-limiting acts or steps included in a method of operating a micro base station node according to an example embodiment and mode. Like act 7A-1, act 7B-1 comprises configuring a subframe to include a micro layer downlink control channel region 38 in addition to a macro layer downlink control channel region 36. Act 7B-2 comprises blanking or muting the macro layer downlink control channel region 36 of the subframe as transmitted from the micro base station node. Act 7B-3 transmitting downlink control signaling to one or more wireless terminals on the micro layer downlink control channel region 38.

Figure 8:
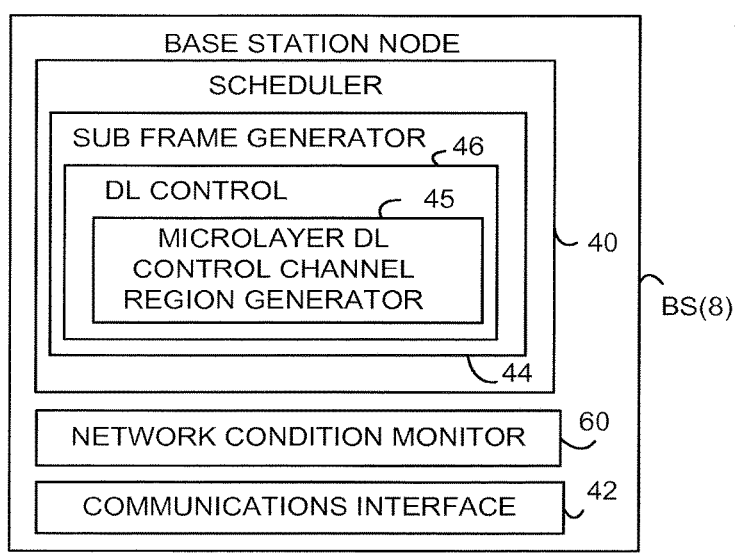
FIG. 8 is a schematic view of a base station node according to another example embodiment that comprises a network condition monitor configured to ascertain a predetermined condition of the heterogeneous radio access network.
Figure 19:
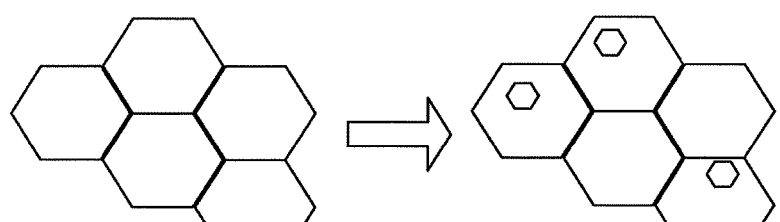
FIG. 19 is a diagrammatic view illustrating basic heterogeneous radio access network deployment.

FIG. 8 shows a base station node BS(8). The base station node BS(8) may include functionalities and/or units such as illustrated and described in conjunction with one or more other embodiments, but further comprises network condition monitor 60. The network condition monitor 60 is configured to ascertain a predetermined condition of the heterogeneous radio access network. In the base station node BS(6) scheduler 40 is configured, as a result of ascertainment of the predetermined condition by network condition monitor 60, to prepare the subframe 34 to include the micro layer downlink control channel region 38 essentially in the manner described herein.

In an example embodiment and mode, the predetermined condition ascertained by network condition monitor 60 is at least one of: (1) a predetermined level of interference from signals in the macro layer downlink control channel region of the subframe; (2) traffic load in the macro layer exceeding a threshold; and (3) a predetermined relation of (i) traffic load within the macro layer and (ii) traffic load within the micro layer. The network condition monitor 60 may be configured to ascertain one or more (e.g., a combination) of these predetermined conditions, and to apply logic upon such detection to determine whether the subframe should include the micro layer downlink control channel region 38.

Figure 9:
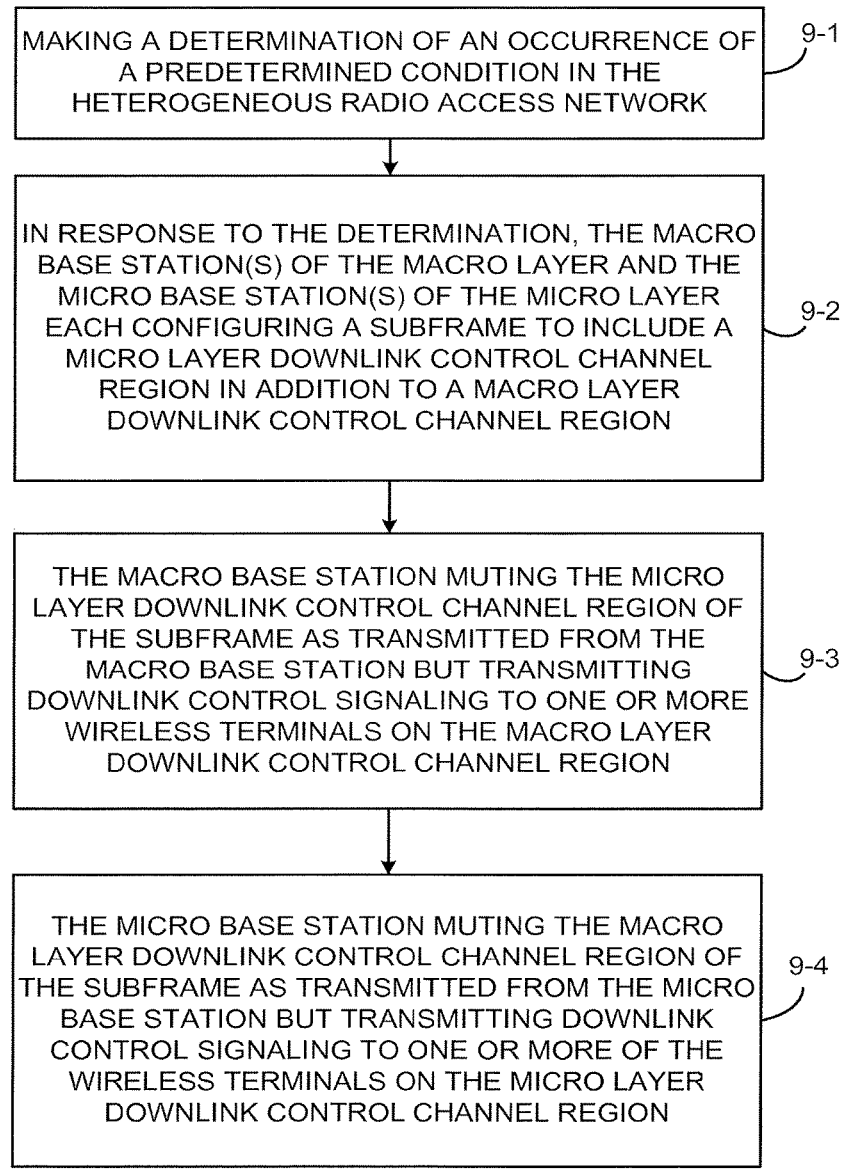
FIG. 9 is a flowchart showing representative, non-limiting acts or steps included in a method of operating a heterogeneous radio access network according to an example embodiment and mode.

FIG. 9 shows representative, non-limiting acts or steps included in a method of operating a heterogeneous radio access network according to an example embodiment and mode, particularly an embodiment which involves ascertainment of the predetermined condition and blanking of a control channel region. Act 9-1 comprises making a determination of an occurrence of a predetermined condition in the heterogeneous radio access network. Act 9-2 comprises, in response to the determination, the macro base station(s) of the macro layer and the micro base station(s) of the micro layer each configuring a subframe to include a micro layer downlink control channel region 38 in addition to a macro layer downlink control channel region 36. Act 9-3 comprises the macro base station(s) 24 muting the micro layer downlink control channel region 38 of the subframe as transmitted from the macro base station(s), but transmitting downlink control signaling to one or more wireless terminals on the macro layer downlink control channel region 36. Act 9-4 comprises the micro base station(s) 26 muting the macro layer downlink control channel region 36 of the subframe as transmitted from the micro base station(s), but transmitting downlink control signaling to one or more of the wireless terminals on the micro layer downlink control channel region 38.

Figure 10:
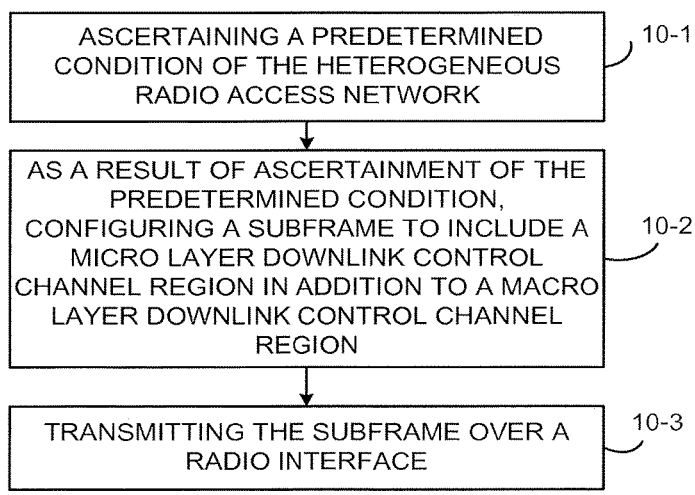
FIG. 10 is a flowchart showing representative, non-limiting acts or steps included in a method of operating a macro base station node according to an example embodiment and mode which comprises ascertaining a predetermined condition of a heterogeneous radio access network and configuring a subframe to include a micro layer downlink control channel region as a result of the ascertainment.

FIG. 10 shows representative, non-limiting acts or steps included in a method of operating a base station node according to an example embodiment and mode. Act 10-1 comprises ascertaining a predetermined condition of the heterogeneous radio access network. The predetermined condition can be monitored or detected, for example, by network condition monitor 60. Act 10-2 comprises, as a result of ascertainment of the predetermined condition, configuring the subframe to include a micro layer downlink control channel region 38 in addition to a macro layer downlink control channel region 36. Act 10-3 comprises transmitting the subframe over a radio interface.

Figure 11:
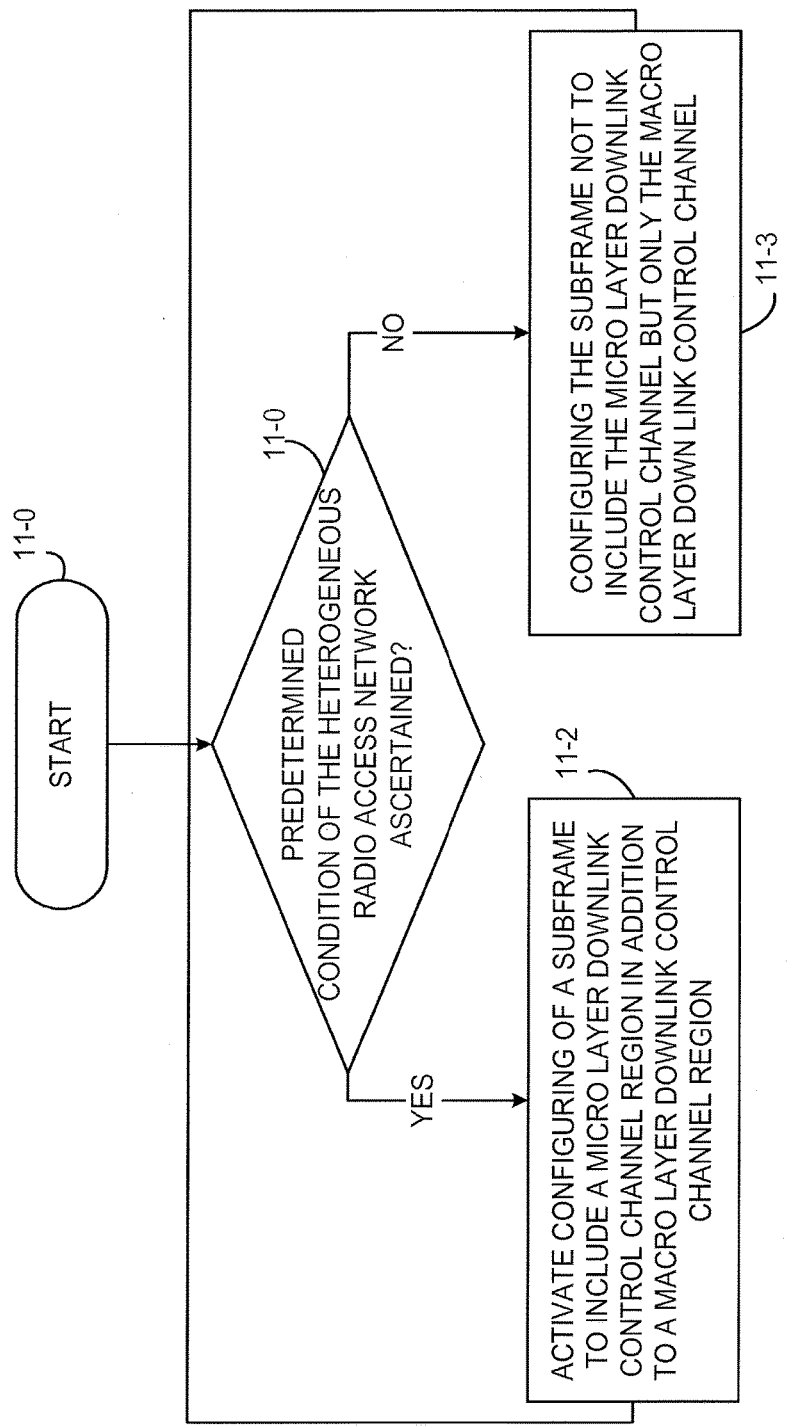
FIG. 11 is a flowchart showing representative, non-limiting acts or steps included in a method of operating a macro base station node according to an example embodiment and mode which comprises dynamic activation and deactivation of inclusion of a micro layer downlink control channel region.

In an example embodiment, the scheduler 40 may be configured to dynamically activate and deactivate the micro layer downlink control channel region 38 in dependence upon the predetermined condition ascertained by network condition monitor 6Q. In this regard, FIG. 11 shows representative, non-limiting acts or steps included in a method of operating a base station node according to an example embodiment and mode which comprises dynamic activation and deactivation of inclusion of a micro layer downlink control channel region. Act 11-0 depicts initialization and/or starting of the procedure for dynamic allocation of the micro layer downlink control channel region 38. Act 11-1 comprises determining whether a predetermined condition of the heterogeneous radio access network has been ascertained. As indicated above, the predetermined condition ascertained by network condition monitor 60 can be one or more of several conditions. If it is determined at act 11-1 that a predetermined condition has been ascertained (e.g., monitored or detected), as act 11-2 the scheduler 40 activates the configuring of the subframe to include the micro layer downlink control channel region 38 in addition to the macro layer downlink control channel region 36. If the predetermined condition is not ascertained at act 11-1, as act 11-3 the subframe is configured not to include the micro layer downlink control channel region 38. As shown in FIG. 11, the network condition monitor 60 keeps returning in looped fashion back to act 11-1 so that the network condition monitor 60 can repetitively (e.g., periodically or upon occurrence of predetermined event) whether the condition of the heterogeneous radio access network has changed to warrant a further decision whether or not to include the micro layer downlink control channel region 38 in the subframe. Advantageously, the granularity of the switching (e., the decision whether to include the micro layer downlink control channel region or not) may be made on a subframe by subframe basis. This granularity results from, e.g., the fact that resources (RBs [bearers]) may be scheduled on a subframe basis by the micro cell.

Figure 12:
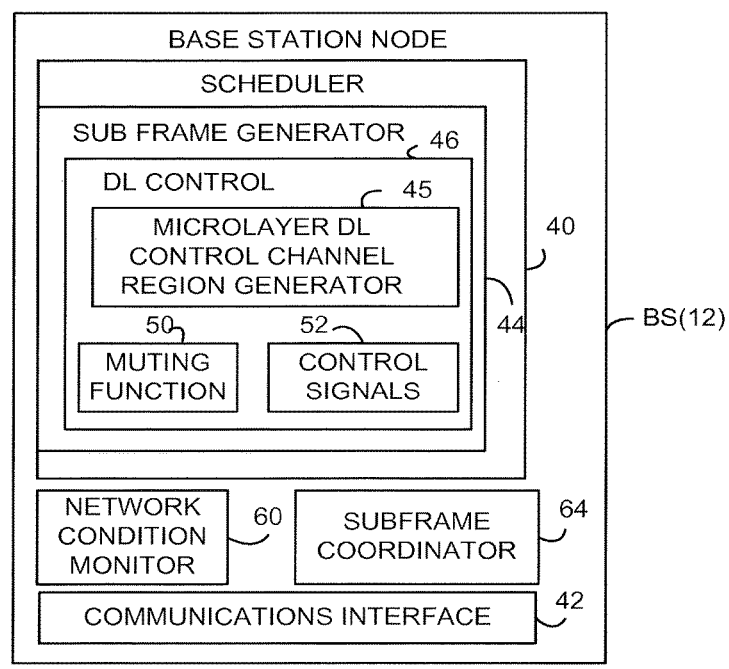
FIG. 12 is a schematic view of a base station node according to another example embodiment that comprises a subframe coordinator.

FIG. 12 shows a base station node BS(12). The base station node BS(12) may include functionalities and/or units such as illustrated and described in conjunction with one or more other embodiments including the network condition monitor 60 of base station node BS(8), but further comprises coordinator 64. The coordinator 64 is configured to coordinate, with at least one other base station node of the heterogeneous radio access network 20, the inclusion of the micro layer downlink control channel region 38 in the subframe 34.

Figure 13:
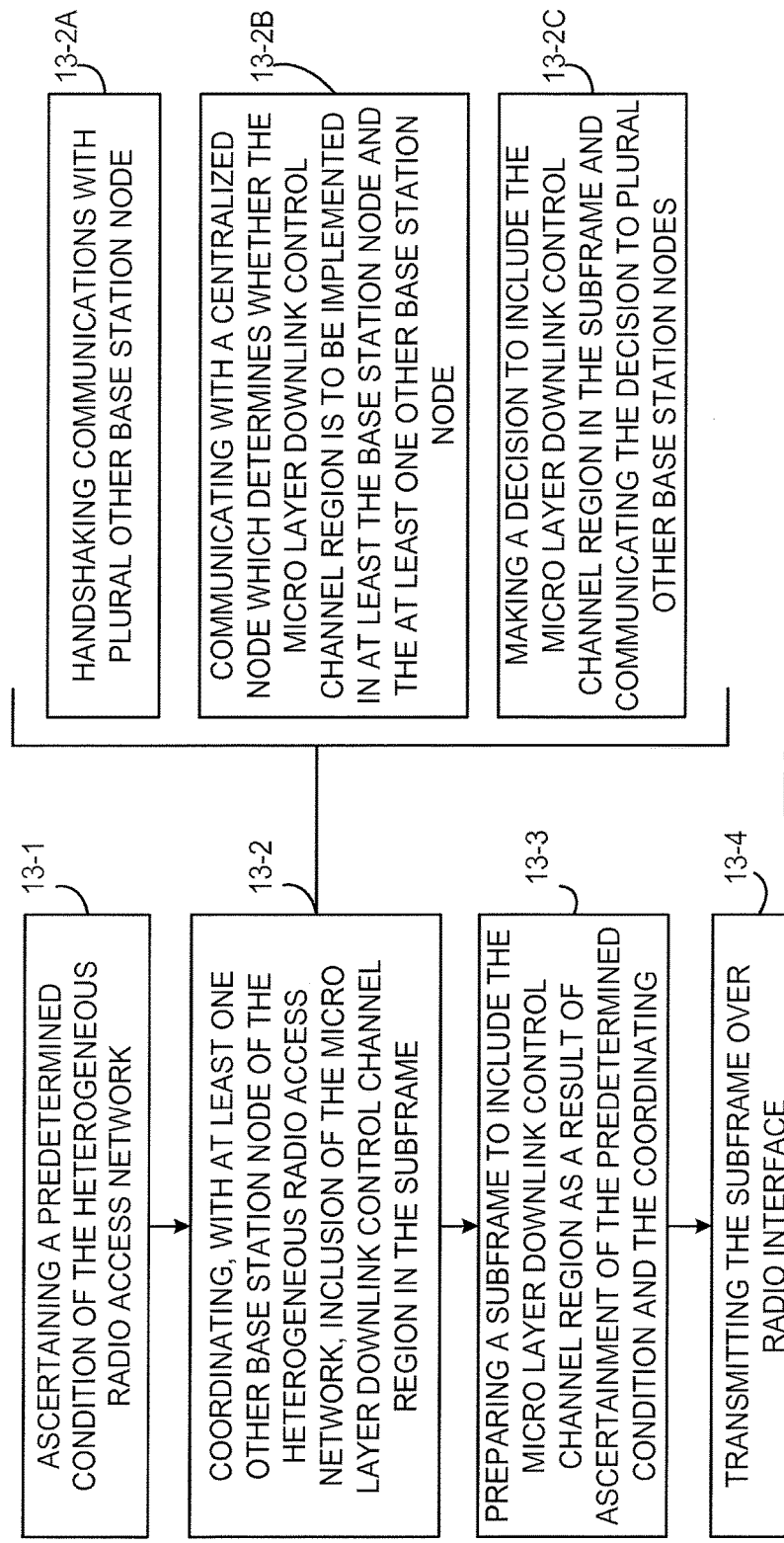
FIG. 13 is a flowchart showing representative, non-limiting acts or steps included in a method of operating a macro base station node according to an example embodiment and mode which comprises coordinating inclusion of the micro layer downlink control channel region with other nodes of a heterogeneous radio access network.

FIG. 13 shows representative, non-limiting acts or steps included in a method of operating a base station node according to an example embodiment and mode, and which method comprises coordinating inclusion of the micro layer downlink control channel region with other nodes of a heterogeneous radio access network. Act 13-1 comprises ascertaining a predetermined condition of the heterogeneous radio access network. In an example embodiment act 13-1 may be performed by network condition monitor 60, and the predetermined condition may be one or more (e.g., a combination) of the predetermined conditions already mentioned above. Typically the serving cell, when a wireless terminal 30 attaches to it, makes a determination that the additional control symbols of the micro layer downlink control channel region 38 are needed, and the base station of the serving cell (whether a macro base station 24 or a micro base station 26) signals to the surrounding cells (whether pico or macro) in the coordination process. Act 13-2 comprises coordinating, with at least one other base station node of the heterogeneous radio access network, inclusion of the micro layer downlink control channel region in the subframe. Act 13-3 comprises preparing a subframe to include the micro layer downlink control channel region as a result of ascertainment of the predetermined condition and the coordinating. Act 13-4 comprises transmitting the subframe over the radio interface.

Figure 14A:
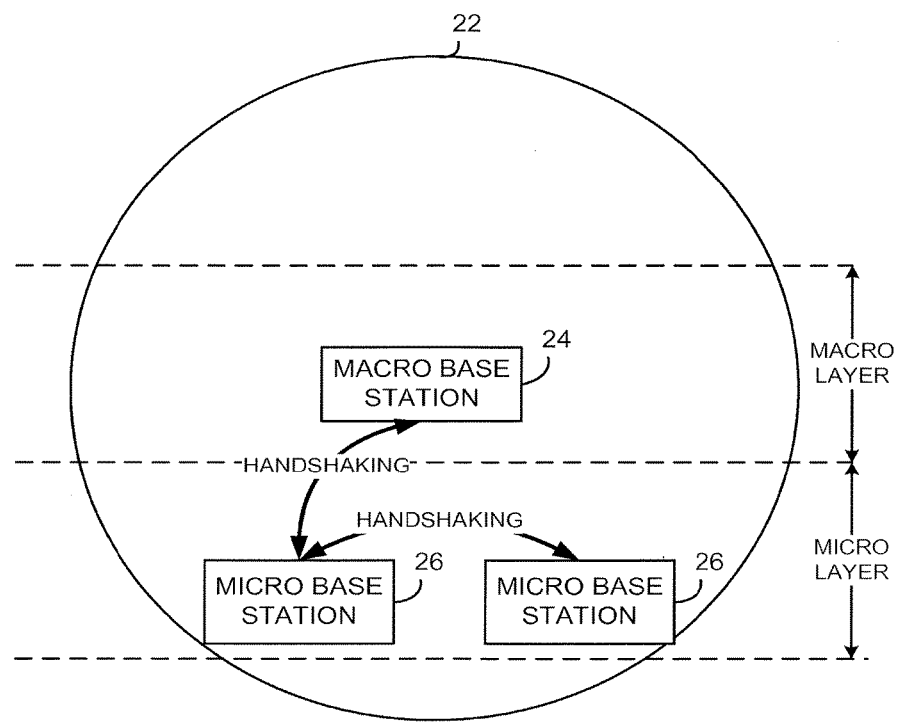
FIG. 14A is a diagrammatic view of portions of a heterogeneous radio access network wherein handshaking is performed prior to implementation of a micro layer downlink control channel region.
Figure 14B:
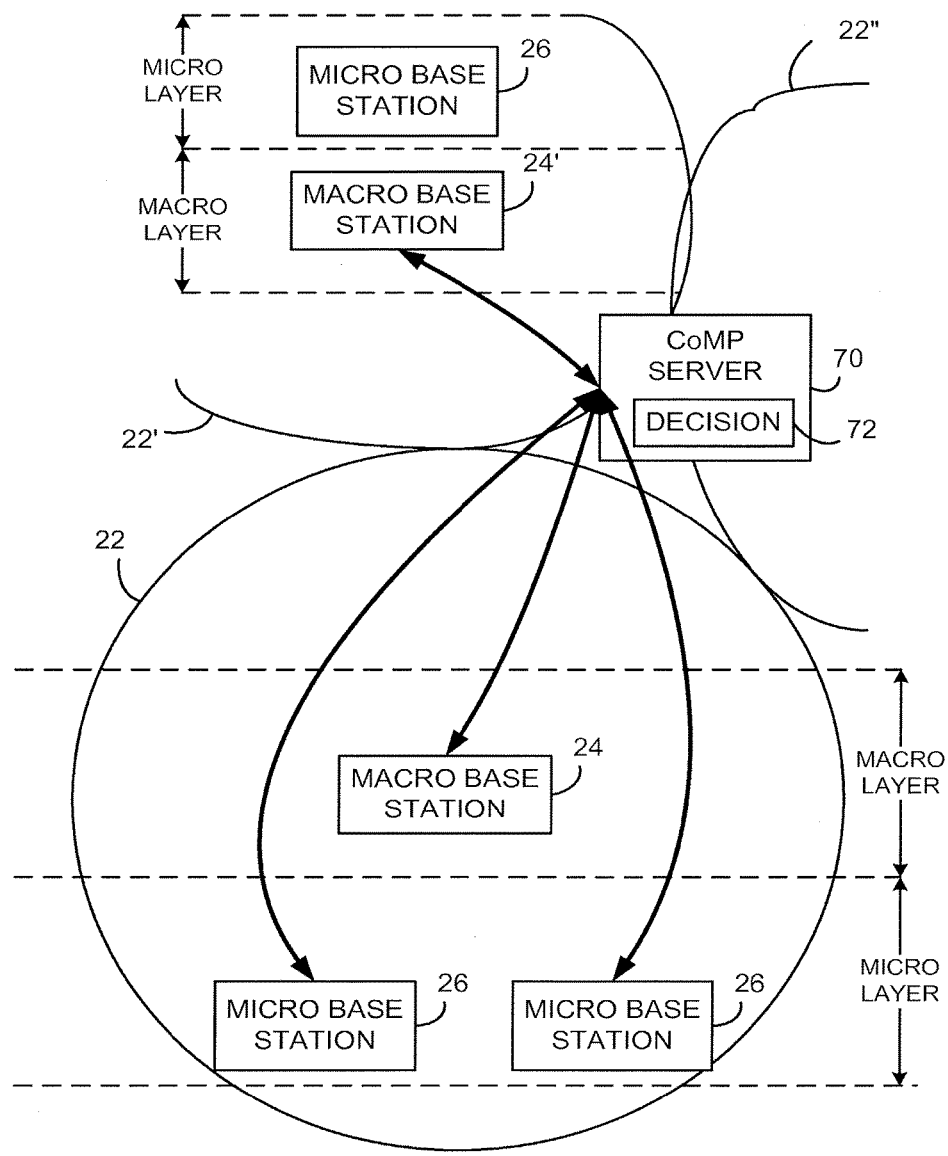
FIG. 14B is a diagrammatic view of portions of a heterogeneous radio access network wherein centralized coordination using a CoMP server is performed prior to implementation of a micro layer downlink control channel region.
Figure 14C:
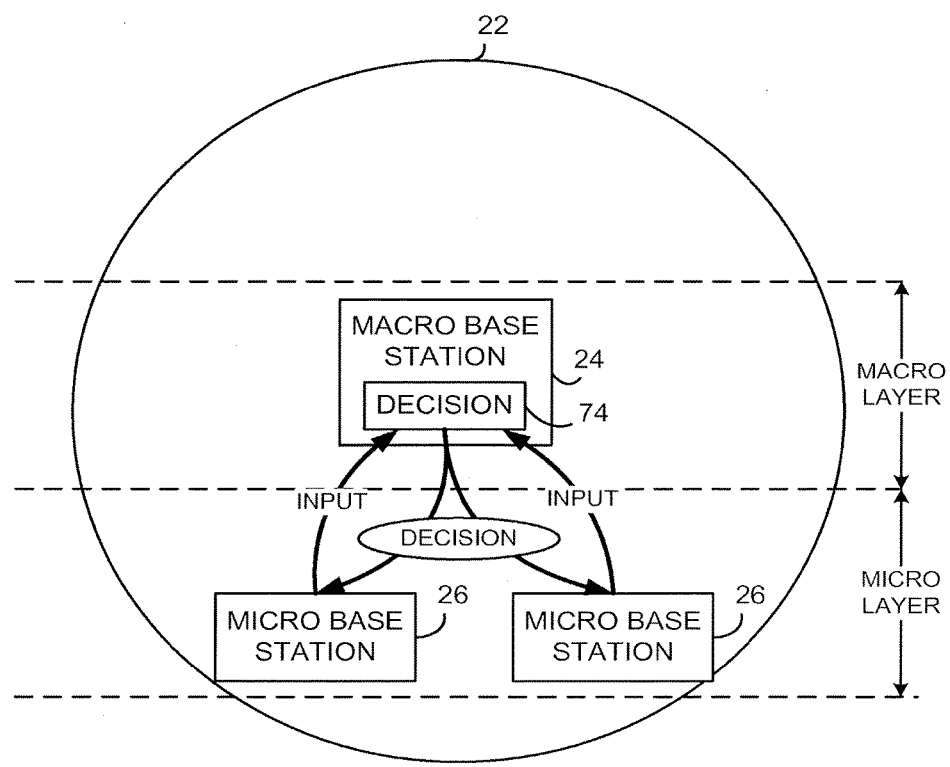
FIG. 14C is a diagrammatic view of portions of a heterogeneous radio access network wherein a macro base station node is entrusted with a decision regarding implementation of a micro layer downlink control channel region.

Various ways of accomplishing coordinating act 13-2 are depicted by sub-act 13-2A through sub-act 13-2C and illustrated respectively by FIG. 14A-FIG. 14C. Each of sub-act 13-2A through sub-act 13-2C thus depict a different implementation. For example, in one example implementation depicted by sub-act 13-2A and FIG. 14A, the method further comprises the base station node coordinating the inclusion of the micro layer downlink control channel region in the subframe by handshaking communications with plural other base station nodes. FIG. 14A particularly illustrates an example scenario in which the predetermined condition is ascertained by a micro base station 26, and the micro base station 26 initiates the handshaking to coordinate use of the micro layer downlink control channel region 38 by other affected base stations, e.g., the other micro base station 26 and the macro base station 24 illustrated in FIG. 14A. The handshaking affords the affected base stations the opportunity to negotiate and jointly implement use of the micro layer downlink control channel region 38. It will be appreciated that in many embodiments the handshaking may involve more than three base stations, and that such handshaking may occur over the X2 interface.

In another example implementation depicted by sub-act 13-2B and FIG. 14B, the method further comprises the base station node coordinating the inclusion of the micro layer downlink control channel region in the subframe by communicating with a centralized node 70. In the FIG. 14B embodiment and mode the centralized node 70 determines whether the micro layer downlink control channel region 38 is to be implemented among affected base stations. The determination by the centralized node 70 is reflected by decision logic 72 in FIG. 14B. The centralized node 70 may be, for example, a CoMP server which comprises a Coordinated Multipoint (CoMP) system as previously mentioned. FIG. 14B further illustrates that the centralized node 70 may indeed coordinate the use of the micro layer downlink control channel region 38 with plural cells, example further cells 22' and 22" being illustrated in FIG. 14B.

In another example implementation depicted by sub-act 13-2C and FIG. 14C, the method further comprises the base station node coordinating the inclusion of the micro layer downlink control channel region in the subframe by making a decision to include the micro layer downlink control channel region in the subframe and communicating the decision to plural other base station nodes. The implementation decision of the FIG. 14C mode and embodiment is depicted by decision logic 74. FIG. 14C illustrates the implementation of the decision (e.g., the decision to use the micro layer downlink control channel region 38) being communicated to other affected base stations. As shown in FIG. 14C, decision logic 74 may receive inputs from the affected base stations and may use the inputs from the affected base stations in order to make its decision of whether to implement the micro layer downlink control channel region 38. Such inputs may, for example, comprise which other base stations are currently requesting or recommending inclusion of the micro layer downlink control channel region 38. In the example mode and embodiment of FIG. 14C the decision logic 74 is essentially entrusted with making an authoritative decision which, although based on input(s) received from the other affected base stations, is not necessarily negotiated with the other affected base stations.

Figure 15:
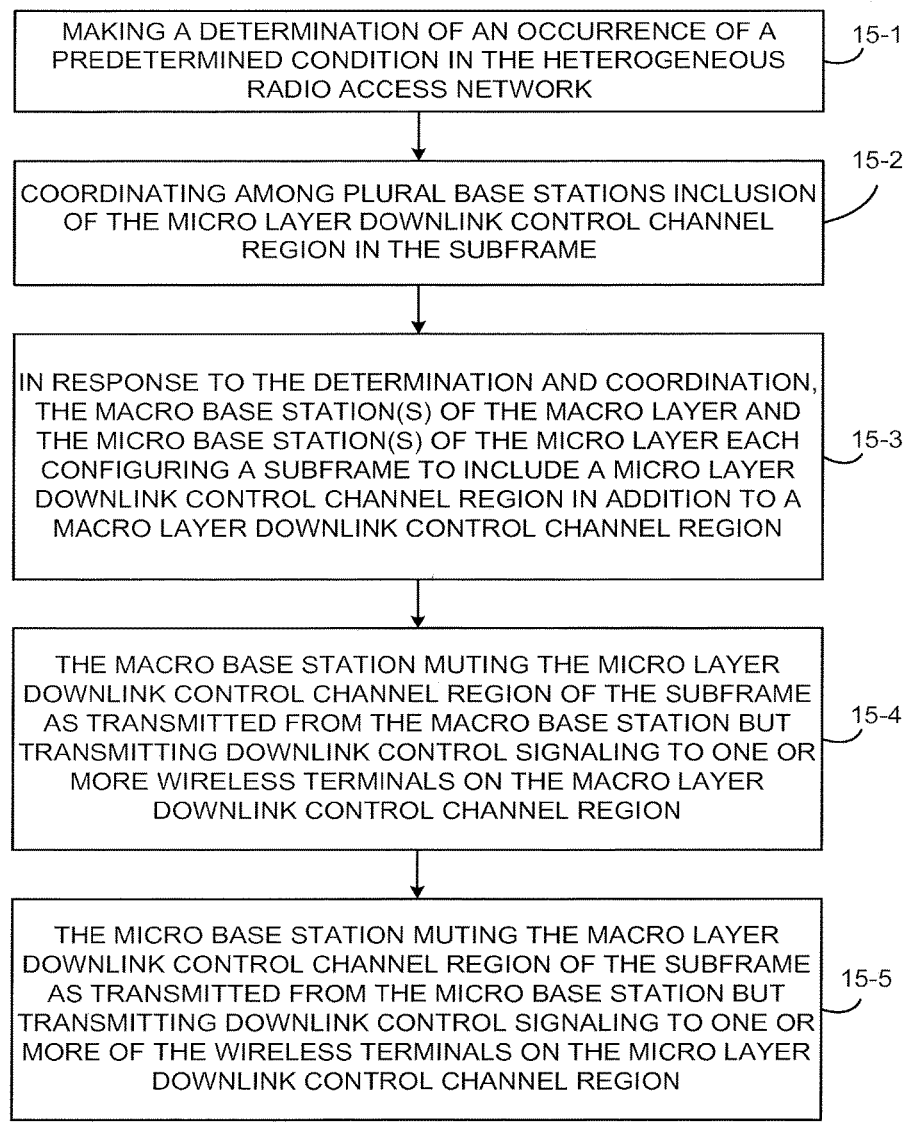
FIG. 15 is a flowchart showing representative, non-limiting acts or steps included in a method of operating a heterogeneous radio access network according to an example embodiment and mode which comprises coordinating inclusion of the micro layer downlink control channel region among plural base station nodes of the heterogeneous radio access network.

FIG. 15 shows representative, non-limiting acts or steps included in a method of operating a heterogeneous radio access network according to an example embodiment and mode, particularly an embodiment which involves ascertainment of the predetermined condition and coordination of implementation of use of the micro layer downlink control channel region 38 among plural affected base stations. Act 15-1 comprises making a determination of an occurrence of a predetermined condition in the heterogeneous radio access network. Act 15-2 comprises coordinating among plural base stations inclusion of the micro layer downlink control channel region in the subframe. The determination of act 15-1 and coordination of act 15-2 may be made, for example, in accordance with any of the differing embodiments and modes of FIG. 14A-FIG. 14C. Act 15-3 comprises, in response to the determination and coordination of acts 15-1 and 15-2, the macro base station(s) 24 of the macro layer and the micro base station(s) 26 of the micro layer each configuring a subframe to include a micro layer downlink control channel region 38 in addition to a macro layer downlink control channel region 36. Act 15-4 comprises the macro base station(s) 26 muting the micro layer downlink control channel region 38 of the subframe as transmitted from the macro base station(s) but transmitting downlink control signaling to one or more wireless terminals on the macro layer downlink control channel region. Act 15-5 comprises the micro base station(s) 26 muting the macro layer downlink control channel region 38 of the subframe as transmitted from the micro base station(s) 26 but transmitting downlink control signaling to one or more of the wireless terminals on the micro layer downlink control channel region 38.

Figure 16:
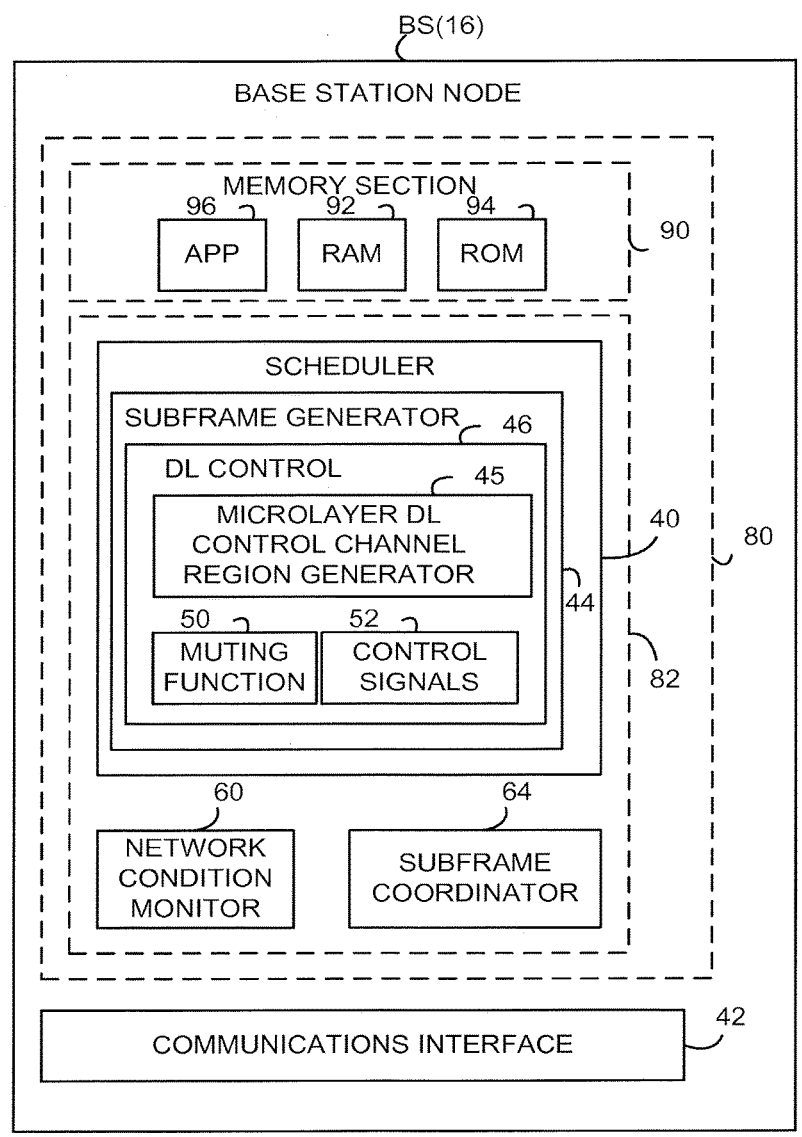
FIG. 16 is a schematic view of a base station node according to another example embodiment wherein at least portions of the base station node are provided by/on a machine platform.

In an example embodiment of base station node BS(16) illustrated by FIG. 16, various functional units of base station node 28 are provided on a platform 80. The terminology "platform" is a way of describing how the functional units of a base station node can be implemented or realized by machine. One example platform 80 is a computer implementation wherein one or more of the framed elements, including scheduler 40, are realized by one or more processors 82 which execute coded instructions and use non-transitory signals in order to perform the various acts described herein. In such a computer implementation the base station node may comprise, in addition to a processor(s), memory section 90 (which in turn may comprise random access memory 92; read only memory 94; application memory 96 (which stores, e.g., coded instructions which can be executed by the processor to perform acts described herein); and any other memory such as cache memory, for example).

Typically the platform 80 of a base station node also comprises other input/output units or functionalities not specifically illustrated in FIG. 16, such as a keypad; an audio input device (e.g. microphone); a visual input device (e.g., camera); a visual output device; and an audio output device (e.g., speaker). Other types of input/output devices can also be connected to or comprise the base station node.

In the example of FIG. 16 the platform 80 has been illustrated as computer-implemented or computer-based platforms. Another example platform suitable for the base station node and/or scheduler 40 in particular is that of a hardware circuit, e.g., an application specific integrated circuit (ASIC) wherein circuit elements are structured and operated to perform the various acts described herein.

Figure 17:
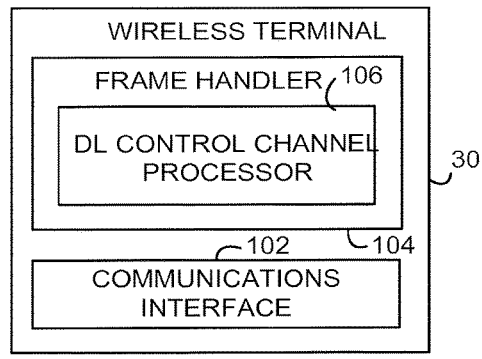
FIG. 17 is a schematic view of a wireless terminal according to an example embodiment.

FIG. 17 shows a wireless terminal 30 for use in a heterogeneous radio access network according to an example embodiment. The wireless terminal 30 comprises communications interface 102 and frame handler 104. The communications interface 102 is configured to receive an indication over the a radio interface that a subframe carried over the radio interface includes a micro layer downlink control channel region 38 in addition to a macro layer downlink control channel region 36. The frame handler 104 is configured to obtain a downlink control signal from either the macro layer downlink control channel region 36 or the micro layer downlink control channel region 38. To this end, frame handler 104 comprises a downlink control channel processor 106. In some situations, such as when the wireless terminal operates in Coordinated Multipoint (CoMP) system or mode, the frame handler 104 may obtain a downlink control signal from either the macro layer downlink control channel region 36 or the micro layer downlink control channel region 38, such downlink control signal being essentially the same in content from both regions.

In some example embodiments, when in the Coordinated Multipoint (CoMP) system or mode the wireless terminal assigned to a micro cell may have a choice of whether to obtain the downlink control signal from the macro layer downlink control channel region or the micro layer downlink control channel region. But in other example embodiments, whether or not in a Coordinated Multipoint (CoMP) system or mode, if the quality of the control symbols in the macro control layer for the micro cell is sufficient, the frame handler 104 of a wireless terminal assigned to a micro cell will use the downlink control signal of the macro layer downlink control channel region. On the other hand, in a CoMP system/mode (in which the downlink control signal from the macro layer downlink control channel region is the same as the downlink control signal from the micro layer downlink control channel region) a wireless terminal assigned to the micro cell will use the downlink control signal from the micro layer downlink control channel region from which to obtain an effective downlink control if the downlink control signal from the macro layer downlink control channel region is not sufficient. Table 1 shows various valid scenarios.

TABLE 1

| | Macro Cell | Micro Cell | Employed by terminal |
|---|---|---|---|
| Macro Control Region | best | | Macro control region from macro cell |
| Macro Control Region | | Best | Macro control region from micro cell |
| Micro Control Region | | Best | Micro control region from micro cell |
| CoMP | Macro control region | Macro control region | CoMP of macro control region in macro cell and macro control region from micro cell |
| CoMP | Macro control region | Micro control region | CoMP of macro control region from macro cell and micro control region of micro cell |

In yet another embodiment and mode in which CoMP is utilized and the wireless terminal is assigned to the micro layer, the wireless terminal may combine the downlink control signal from the macro layer downlink control channel region and the downlink control signal from the micro layer downlink control channel region to constructively form a better estimate of the downlink control signal.

If the wireless terminal 30 is instead assigned to the macro layer, the wireless terminal 30 will use the standard (macro layer) control channels (e.g., the control channels of macro layer downlink control channel region 36).

Whether the wireless terminal 30 uses control channel of the macro layer (e.g., of the macro layer downlink control channel region 36) or of the micro layer (e.g., of the micro layer downlink control channel region 38) may depend on to which cell the wireless terminal 30 attaches. The wireless terminal 30 searches for a strongest serving cell and attaches to that cell, whether a macro cell 22 or a micro cell 28. If the strongest signal is from the micro cell 28, the wireless terminal 30 attaches to the micro cell 28. If the strongest signal is from the macro cell 22, the wireless terminal 30 attaches to the macro cell 22. Once it is attached, the wireless terminal 30 may request a grant of blocks to transmit data and the identification of the granted blocks will be over the downlink (DL) control channels. But it is problematic if the control channels that carry the grant are being interfered with, in which case the wireless terminal 30 cannot obtain the grant to set up a call. The technology disclosed herein therefore advantageously makes available additional control channels (e.g., the micro layer downlink control channel region 38) that are less likely to have interference from the macro layer.

A wireless terminal 3Q knows how to discriminate its control channels from the control channels of other wireless terminals by scanning the appropriate control channel region and looking (e.g., in PDCCH in the LTE environment) for an identifier that identifies the particular wireless terminal 30. The wireless terminal 30 constantly monitors the control channel, looking for the particular PDCCH that is addressed to the wireless terminal 30. The wireless terminal 30 knows the size of its PDCCH because of the PDFICH value in PDCCH.

Figure 18:
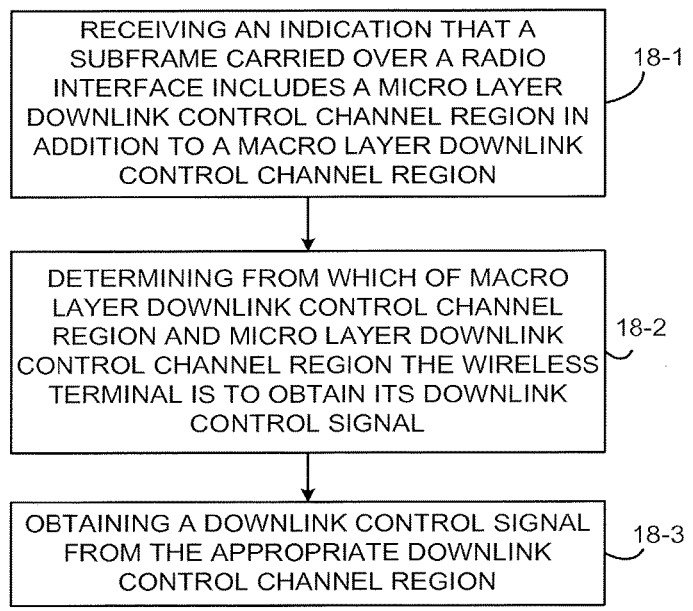
FIG. 18 is a flowchart showing representative, non-limiting acts or steps included in a method of operating a wireless terminal according to an example embodiment and mode.

FIG. 18 shows representative, non-limiting acts or steps included in a method of operating a wireless terminal 30 according to an example embodiment and mode. As act 18-1, the method of FIG. 18 comprises receiving an indication that a subframe carried over a radio interface includes a micro layer downlink control channel region 38 in addition to a macro layer downlink control channel region 36. Act 18-2 comprises the wireless terminal determining from which of macro layer downlink control channel region 36 and micro layer downlink control channel region 38 the wireless terminal 30 is to obtain its downlink control signal. Act 18-3 comprises the wireless terminal obtaining a downlink control signal from the appropriate downlink control channel region, e.g., the downlink control channel region which was determined in act 18-2 (either from the macro layer downlink control channel region 36 or the micro layer downlink control channel region 38).

In some situations such as in a CoMP system, the downlink control signal from the macro layer downlink control channel region 36 may be the same as the downlink control signal from the micro layer downlink control channel region 38. In such situations, act 18-2 may comprise the wireless terminal determining which of macro layer downlink control channel region 36 and the micro layer downlink control channel region 38 has the best quality signal. Alternatively, the decision of act 18-2 may be based on other criteria (such as, for example constructively adding the downlink control signal from the macro layer downlink control channel region 36 and the downlink control signal from micro layer downlink control channel region 38 in a CoMP system/mode.

Thus, in some of its embodiments and aspects, the technology disclosed herein uses use additional PDCCH symbols so as to enable downlink (DL) CoMP on the control symbols between macro cells and micro cells within a heterogeneous deployment, and doing so to mitigate the intercell interference on the control channel without adversely affecting the control channel capacity in heavily loaded heterogeneous networks.

In at least some example embodiments radio resources are well utilized in the system, in comparison to the scheme employing almost blank sub-frames (ABS) [where resources are wasted at the macro layer]. For example, in a heavy loaded system, where the lack of control channel resources is a bottleneck, the use of ABS does not address the control channel capacity issue. However, in at least some of its various aspects the technology disclosed herein allows the flexible addition of PDCCH resources and while mitigating downlink control channel congestion in a heterogeneous network.

Although the description above contains many specificities, these should not be construed as limiting the scope of the invention but as merely providing illustrations of some of the presently preferred embodiments of this invention. For example, the technology disclosed herein may be utilized for closed subscriber group (CSG) femtos (e.g., femtocells) or home eNBs, where a coordination between macros and femtos so allows and where muting is applied.

Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A base station node of a heterogeneous radio access network, the heterogeneous radio access network comprising a macro layer including at least one macro base station and a micro layer comprising at least one micro base station, the base station node comprising:
   one or more processors configured to prepare a subframe to include a micro layer downlink control channel region and a macro layer downlink control region, wherein:
      the micro layer downlink control channel region comprises micro layer downlink control channel resource elements distinct from any reference signal resource elements;
      the macro layer downlink control channel region comprises macro layer downlink control channel resource elements distinct from the reference signal resource elements;
      the resource elements of the micro layer downlink control region are interleaved with the resource elements of the macro layer downlink control region in time and frequency; and
      one of the micro layer downlink control channel region or the macro layer downlink control channel region includes downlink control signaling to one or more wireless terminals and the other of the micro layer downlink control channel region or the macro layer downlink control channel region is muted; and
   a communication interface configured to transmit at least the subframe over a radio interface.

2. The base station node of claim 1, wherein the base station node is a macro base station node that includes the downlink control signaling on the macro layer downlink control channel region and mutes the micro layer downlink control channel region.

3. The base station node of claim 1, wherein the base station node is a micro base station node that includes the downlink control signaling on the micro layer downlink control channel region and mutes the macro layer downlink control channel region.

4. The base station node of claim 1, wherein the macro layer downlink control region precedes the micro layer downlink control region with reference to symbol order.

5. The base station node of claim 1, wherein the micro layer downlink control region precedes the macro layer downlink control region with reference to symbol order.

6. The base station node of claim 1, wherein the one or more processors are further configured to dynamically activate and deactivate inclusion of the micro layer downlink control channel region.

7. The base station node of claim 1, wherein the one or more processors are further configured to coordinate, via handshaking communications with at least one other base station node of the heterogeneous radio access network, the inclusion of the micro layer downlink control channel region in the subframe.

8. The base station node of claim 1, wherein the one or more processors are further configured to coordinate, via communication with a Coordinated Multipoint (CoMP) server or other centralized node that coordinates at least one other base station node of the heterogeneous radio access network, the inclusion of the micro layer downlink control channel region in the subframe.

9. The base station node of claim 1, a coordinator configured to coordinate sending, in one of the micro layer downlink control channel region or the macro layer downlink control channel region, the same control information that at least one other base station node sends to the same wireless terminal in the other of the micro layer downlink control channel region or the macro layer downlink control channel region.

10. The base station node of claim 1, wherein:
in addition to the micro layer downlink control channel resource elements, the micro layer downlink control channel region further comprises one or more of the reference signal resource elements; and/or
in addition to the macro layer downlink control channel resource elements, the macro layer downlink control channel region further comprises one or more of the reference signal resource elements.

11. A method in a base station node of a heterogeneous radio access network, the heterogeneous radio access network comprising a macro layer including at least one macro base station and a micro layer comprising at least one micro base station, the method comprising:
preparing a subframe to include a micro layer downlink control channel region and a macro layer downlink control region, wherein:
the micro layer downlink control channel region comprises micro layer downlink control channel resource elements distinct from any reference signal resource elements;
the macro layer downlink control channel region comprises macro layer downlink control channel resource elements distinct from the reference signal resource elements;
the resource elements of the micro layer downlink control region are interleaved with the resource elements of the macro layer downlink control region in time and frequency; and
one of the micro layer downlink control channel region or the macro layer downlink control channel region includes downlink control signaling to one or more wireless terminals and the other of the micro layer downlink control channel region or the macro layer downlink control channel region is muted; and
transmitting at least the subframe over a radio interface.

12. The method of claim 11, wherein preparing the subframe comprises including the downlink control signaling on the macro layer downlink control channel region and muting the micro layer downlink control channel region.

13. The method of claim 11, wherein preparing the subframe comprises including the downlink control signaling on the micro layer downlink control channel region and muting the macro layer downlink control channel region.

14. The method of claim 11, wherein the macro layer downlink control region precedes the micro layer downlink control region with reference to symbol order.

15. The method of claim 11, wherein the micro layer downlink control region precedes the macro layer downlink control region with reference to symbol order.

16. The method of claim 11, further comprising dynamically activating and deactivating inclusion of the micro layer downlink control channel region.

17. The method of claim 11, further comprising coordinating, via handshaking communications with at least one other base station node of the heterogeneous radio access network, the inclusion of the micro layer downlink control channel region in the subframe.

18. The method of claim 11, further comprising coordinating, via communication with a Coordinated Multipoint (CoMP) server or other centralized node that coordinates at least one other base station node of the heterogeneous radio access network, the inclusion of the micro layer downlink control channel region in the subframe.

19. The method of claim 11, further comprising coordinating to send, in one of the micro layer downlink control channel region or the macro layer downlink control channel region, the same control information that at least one other base station node sends to the same wireless terminal in the other of the micro layer downlink control channel region or the macro layer downlink control channel region.

20. A non-transitory computer readable comprising coded instructions that, when executed by one or more processors, cause a base station node to:
prepare a subframe to include a micro layer downlink control channel region and a macro layer downlink control region, wherein:
the micro layer downlink control channel region comprises micro layer downlink control channel resource elements distinct from any reference signal resource elements;
the macro layer downlink control channel region comprises macro layer downlink control channel resource elements distinct from the reference signal resource elements;
the resource elements of the micro layer downlink control region are interleaved with the resource elements of the macro layer downlink control region in time and frequency; and
one of the micro layer downlink control channel region or the macro layer downlink control channel region includes downlink control signaling to one or more wireless terminals and the other of the micro layer downlink control channel region or the macro layer downlink control channel region is muted; and
transmit at least the subframe over a radio interface.

* * * * *